United States Patent
Etoh et al.

(10) Patent No.: US 8,176,033 B2
(45) Date of Patent: May 8, 2012

(54) DOCUMENT PROCESSING DEVICE AND DOCUMENT PROCESSING METHOD

(75) Inventors: Minoru Etoh, Yokohama (JP); Takehiro Nakayama, Tokyo (JP); Yoshikazu Akinaga, Fujisawa (JP)

(73) Assignee: NTT DoCoMo, Inc., Tokyo (JP)

( * ) Notice: Subject to any disclaimer, the term of this patent is extended or adjusted under 35 U.S.C. 154(b) by 475 days.

(21) Appl. No.: 12/427,302

(22) Filed: Apr. 21, 2009

(65) Prior Publication Data

US 2009/0265344 A1    Oct. 22, 2009

(30) Foreign Application Priority Data

Apr. 22, 2008    (JP) .............. P2008-111524
Jan. 7, 2009    (JP) .............. P2009-001747

(51) Int. Cl.
*G06F 7/00*    (2006.01)
(52) U.S. Cl. ............................ 707/709
(58) Field of Classification Search .......... None
See application file for complete search history.

(56) References Cited

U.S. PATENT DOCUMENTS

| | | |
|---|---|---|
| 6,112,202 A | 8/2000 | Kleinberg |
| 6,285,999 B1 | 9/2001 | Page |
| 2005/0234880 A1* | 10/2005 | Zeng et al. ............... 707/3 |
| 2007/0143345 A1 | 6/2007 | Jones et al. |
| 2007/0198506 A1* | 8/2007 | Attaran Rezaei et al. ....... 707/5 |

FOREIGN PATENT DOCUMENTS

| | | |
|---|---|---|
| JP | 10-207901 | 8/1998 |
| JP | 2002-32401 | 1/2002 |

OTHER PUBLICATIONS

"Theme title: Creation of Standard Technologies on Search Engines", URL:http://www.jpo.go.jp/shiryou/s_sonota/hyoujun_gijutsu/search_engine/douko.htm, Data of JPO Policy Planning and Research Division Technical Trends, Searched Jan. 29, 2008, 4 Website pages and 2 pages of Translation.

(Continued)

*Primary Examiner* — Truong Vo
(74) *Attorney, Agent, or Firm* — Oblon, Spivak, McClelland, Maier & Neustadt, L.L.P.

(57) ABSTRACT

A document processing method, including: a collection step of collecting access history of a user; a document similarity computing step of computing a document similarity, which indicates similarity between documents, by one user pattern which indicates a plurality of users who have accessed one document and another user pattern which indicates a plurality of users who have accessed another document, according to the access history collected in the collection step; a keyword weight vector correction step of correcting a keyword weight vector of the one document using the document similarity computed in the document similarity computing step; and an evaluation value calculation step of calculating an evaluation value for input information for searching, based on the keyword weight vector corrected in the keyword weight vector correction step.

14 Claims, 28 Drawing Sheets

OTHER PUBLICATIONS

Masanori Harada, "Technical Trends of WWW Search Engines" The Institute of Electronics, Information and Communication Engineers, 2001, Technical Report of IEICE, SSE2000-228, pp. 17-22 with 7 pages of Translation.

Matthew Richardson, et al. "Beyond PageRank: Machine Learning for Static Ranking" URL:http://www2006.org/programme/files/xhtml/3101/p3101-Richardson.html May 2006, 18 pages.

Shohei Tsujimoto, et al., "A Support Facility for Browsing in WWW based on User's Context" The Annual Conference of the Japanese Society for Artificial Intelligence, Jun. 24, 1997, pp. 466-467 with 7 pages of Translation.

"A Technique of WWW page Ranking Considering Browsing Records" URL:http://www.jpo.go.jp/shiryou/s_sonota/hyoujun_gijutsu/search_engine/e/e21.htm , JPO Policy Planning Research Division, 1-3 pages of Translation and 2 Website pages, Jun. 24, 1997.

* cited by examiner

Fig.9

NAVIGATION BASED ON PURPOSE

SEEING NEWLY RELEASED MODEL
SEARCHING FAVORITE MODEL
SEARCHING MODEL ALLOWING LISTENING TO MUSIC?
WANTING DATA COMMUNICATION
WANTING TO USE GPS NAVIGATION (DIFFERENT WINDOW OPENS)
SELECTING CHARGE PLAN THAT MATCHES WITH MYSELF
KNOWING VARIOUS DISCOUNTS
KNOWING POINTS
CHANGING PACKET CHARGE TO FIXED RATE

FREQUENTLY ASKED QUESTIONS (FAQ)
FOR THEFT, LOSS, FAILURE
KNOWING ABOUT PIN
TAKING PROCEDURE TO CHANGE MODEL
WANTING TO CHANGE ADDRESS

Fig.10

| FIELD | KEYWORD | CERTAINTY | SCORE | WORD |
|---|---|---|---|---|
| IT | PORTABLE TELEPHONE (484) | 1.00000 | 552 | NTT DOCOMO (40), DOCOMO (40), DOCOMO SHOP (40), PORTABLE TELEPHONE (30), SERVICE AREA (30), FOMA (30), iMODE (30), ... |
| IT | COMPUTER (118) | 0.32609 | 180 | ADOBE SYSTEMS (60), SHORT CUT (30), XML (30), SERVICE AREA (30), SOFTWARE UPDATE (30) |
| IT | INTERNET SERVICE (54) | 0.11051 | 61 | DOWNLOAD (30), ACCESS LIMIT (30), INTERNET (1) |
| MONEY | CREDIT (106) | 0.10870 | 60 | PIN (30), POINT SERVICE (30) |
| IT | ELECTRONIC MAIL (313) | 0.10870 | 60 | PACKET CHARGE (30), JUNK MAIL (30) |
| MUSIC | ACOUSTIC INSTRUMENT (157) | 0.10870 | 60 | M 1000 (60) |
| MONEY | STOCK (647) | 0.10870 | 60 | INVESTOR (30), STOCK HOLDER (30) |
| LAW | LAW (887) | 0.10870 | 60 | CANCELLATION FEE (30), ANNOUNCEMENT (30) |
| MONEY | ECONOMY (485) | 0.10870 | 60 | INVESTOR (30), COMPANY INFORMATION (30) |
| MONEY | INVESTMENT (951) | 0.05435 | 30 | INVESTOR (30) |

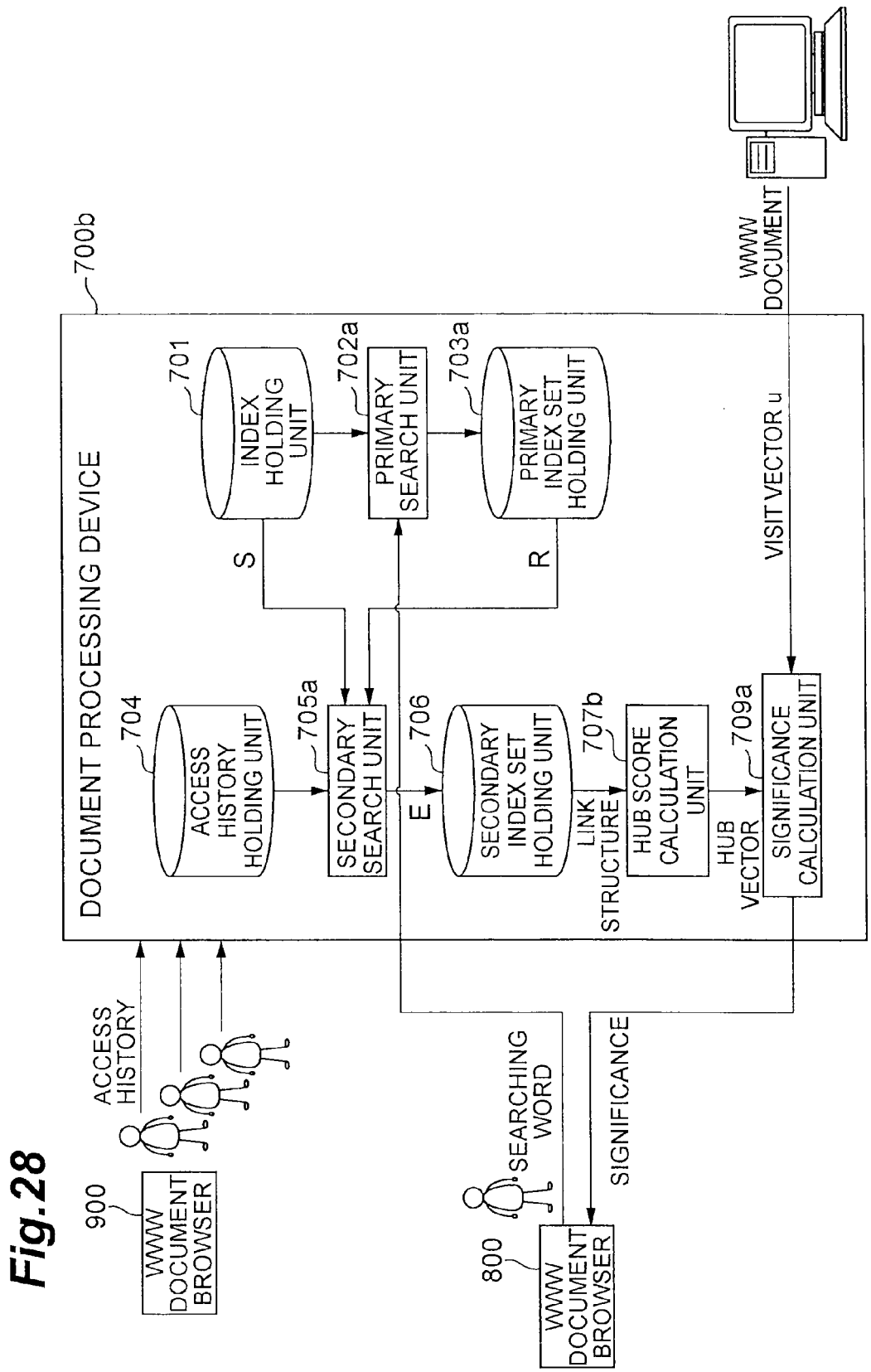

DOCUMENT PROCESSING DEVICE AND DOCUMENT PROCESSING METHOD

BACKGROUND OF THE INVENTION

1. Field of the Invention

The present invention relates to a document processing device and document processing method for searching web data.

2. Related Background Art

Since the mid-1990s, opening WWW documents on the Internet is explosively increasing, and value thereof in the information industry is increasing. A WWW document is positioned in a logical information storage position on the Internet, called a URL (Uniform Resource Locator), and a structured data base is constructed by mutually referring to this URL. A search service to efficiently search this structured data base and provide [the required information] to a user is critical, and a search engine is considered as a system to execute this service.

Description about a search engine is made in Data of the Technology Trend Group Planning and Research Division, Patent Administration Dept., Japan Patent Office: "Theme title: Creation of standard technologies on search engines", an overview of technical trends of WWW search engines, [online], [searched on Jan. 29, 2008], Internet <URL: http://www.jpo.go.jp/shiryou/s_sonota/hyoujun_gijutsu/search_engine/douko.htm>, specifically that a "search engine is handling information space which is enormous and constantly changing, so it must have the following functions which are different from conventional search technology, and research and development are progressing to implement and advance these functions:

function to efficiently collect information dispersed on the WWW function to extract keywords from information described freely in an undefined format in HTML, and search this information at high-speed interface function for each search function to rank enormous search results efficiently."

In Data of the Technology Trend Group Planning and Research Division, Patent Administration Dept., Japan Patent Office: "Theme title: Creation of standard technologies on search engines", an overview of technical trends of WWW search engines, [online], [searched on Jan. 29, 2008], Internet <URL: http://www.jpo.go.jp/shiryou/s_sonota/hyoujun_gijutsu/search_engine/douko.htm>, the following description is included. This search engine is comprised of such components as a "WWW robot, collected text group, indexer, search index file, search server and browser." The WWW robot has a function to "(1) collect information" from the world of the Internet web. The collected WWW pages are stored in the collected text group, and "(2) data analysis (pre-processing)" is performed before transferring the data to the indexer. Index files for a full text search or category search are generated in the components of the indexer and search index file, and a basic data base for "(3) search processing" is operated. Information on input and output is exchanged among the search server, client and browser, where many "(4) input/output interfaces" intervene and function.

FIG. 1 is a diagram depicting a system configuration of a general search system mentioned above. As FIG. 1 shows, a web robot 501 automatically collects web pages containing HTML text from the Internet web 500. The collected web pages are stored in an index file 503 via a server 502. The operator may store each web page in the index file 503 by operating a PC 504.

The user sends a search request to a search server 505 via a web server 506 using a web browser of a terminal 507. The search server 505 performs search processing, referring to the index file 503, and outputs the result to the terminal 507, whereby the terminal can acquire the search result.

By this processing, the user receives an enormous amount of search results. Therefore it is demanded to grasp the search result efficiently. Here a prior art on "a function to efficiently rank the enormous amount of search results" will be described. This function is normally implemented by combining conformity and significance. Conformity is a scale that measures a degree of matching the intention of the search, such as whether the word searched by the user is included frequently [in a WWW document], or whether [the WWW document] matches the search history of the user. Significance is a scale that measures a degree of the beneficial information generally read by many individuals included in a WWW document.

For example, U.S. Pat. No. 6,112,202 Description and "Technical trends of WWW search engines" by Masanori Harada, Technical Report of IEICE, SSE2000-228, pp. 17-22, 2001 describe HITS, which is one ranking search method that implements both conformity and significance. HITS searches web pages including a keyword representing a topic, detecting the authority and hub from a web graph near a web page having a high conformity of the searched web pages. Authority is a scale indicating a web page which is referred to by many hubs in the web graph, and which receives high evaluations. Hub is a scale indicating a web page which corresponds to links, referring to many authorities in the web graph. In HITS, the authority score and hub score of each web page in the web graph is calculated by iterated calculation, and web pages are output in the sequence of the authority score. Thereby significant web pages can be searched out of the web page group related to the provided topic. FIG. 2 is a diagram depicting a concept of an HITS algorithm. As FIG. 2 shows, the web page 601, which is referred to by many web pages, has a high authority score. The web page 602, which refers to many web pages, has a high hub score.

The above is calculated during a search, but as a static method for calculating significance of WWW documents, a page ranking method used by Google Inc. in the USA is well known. For example, as U.S. Pat. No. 6,285,999 Description shows, this page ranking method uses a huge link structure of WWW documents.

For example, if WWW document A refers to WWW document B, it is regarded that WWW document A supports significance of WWW document B. At this time, the significance of WWW document A is weighted by this support. The significance of WWW document A is represented by the sum total of the support of other WWW documents, which refers to [WWW document A] and the weighted significance. In this way, if large scale calculation is performed recurrently, tracking the references of all WWW documents, significance of each WWW document is determined.

Recently due to improved software and browser functions to read WWW documents, browsers that users are accessing are measured, linking with search engines, and this measured popularity is added to the parameters to determine significance.

According to "2 Beyond Page Rank: Machine Learning for Static Ranking" by Matthew Richardson, Amit Prakash, Eric Brill, Proc. WWW 2006, [online], [searched on Jan. 29, 2008], Internet, <URL: http://www2006.org/programme/files/xhtml/3101/p3101-Richardson.html>, the frequency and time when users access (that is, popularity) is added to the page ranking to determine the significance of a WWW document. According to US Patent Application Laid-Open No. 2007/0143345 Description, data on how often [the WWW document] was clicked on, out of the search result during a predetermined period, is used for calculating ranking as a history.

Prior arts on [determining] significance of WWW documents were described above, but a problem is that there are too many choices to present the search result according to conformity. To solve this problem of too many choices, a method of estimating user interest based on browsing history of the user, and rearranging the ranking of the pages listed based on the weight of the characteristics of search history, has been proposed. In "E output interface E-2-(1), output with ranking" reported in Data of the Technology Trend Group Planning and Research Division, Patent Administration Dept., Japan Patent Office: "Theme title: Creation of standard technologies on search engines", an overview of technical trends of WWW search engines, [online], [searched on Jan. 29, 2008], Internet <URL: http://www.jpo.go.jp/shiryou/s_sonota/hyoujun_gijutsu/search_engine/douko.htm>, the following is disclosed.

In other words, in order to solve the problem of too many choices, a method of estimating user interest based on browsing history of this user, and rearranging the sequence of pages listed based on the weight of the characteristics of the search history, is proposed. In more concrete terms, it is assumed that a user browsed pages 1, 2, ..., n following links. Based on the assumption that the interest of the user is higher for the content which was read more recently, weight is increased for the most recently read web page. A weight of a word (weight of index) is determined by adding up the "weight of history" of pages including the target word. This will be described with reference to FIG. 3. FIG. 3 is a diagram depicting the transition of web pages read by a user, and shows that the user sequentially access page 1 to page 4. Here in FIG. 3, Nw(k) indicates a weight of history, and can be expressed by Nw(k)= $r^{n-k}$, for example. The user has browsed page 1, page 2, page 3 and page 4, and since the word "e" is included in page 1, page 3 and page 4, the "weight of index e" is determined by adding the weight of history Nw(k) of these pages.

After the above browsing, the user inputs a keyword to the search engine, and collects necessary information. An index included in each of the collected pages is detected, and the weights of these indexes are added up, whereby the weight of the page, that is the selection candidate, is calculated. The user can access sequentially from a page having a heavier weight. The same method is also disclosed in Japanese Patent Application Laid-Open Nos. 10-207901 and 2002-32401.

In a document search, a search technology using the tf·idf characteristic is under consideration. In this technology, the weight of keyword ti (i=1, ..., M), which appears in a document set $\{D_j|j=1, ..., N\}$ is calculated for each document, and the keyword weight vector $w_j$ is expressed by the following Expression (1).

[Expression 1]

$$w_j = (w_j^1, w_j^2, \ldots, w_j^M)^T \qquad (1)$$

where T denotes transposition.

Here N denotes a number of search target documents, M denotes a number of keywords in a natural language (e.g. Tokyo, portable phone, baseball, station, economy, stocks, ... ), and is a very large number.

Each weight can be calculated by the following Expression (2),

[Expression 2]

$$w_j^i = tf_j^i \times idf_i \qquad (2)$$

In other words, the weight is given by the product of term frequency (tf) and the inverse number of document frequency (idf). Term is a synonym for keyword.

A weight $w_j^i$ of a keyword $t_i$, which appears in a document $D_j$, should be high if [the keyword $t_i$] appears frequently in a document $D_j$, and do not appear infrequently in other documents. If the keyword $t_i$ appears frequently [in document $D_j$] and also appears frequently in other documents, the weight $w_j^i$ may be low. The tf·idf characteristic is a representation of this heuristic knowledge, and can be defined as shown in the following Expressions (3) and Expression (4).

[Expression 3]

$$tf_j^i = \text{freq}(i,j) \qquad (3)$$

where freq(i, j) denotes frequency of appearance of the term $t_i$ in the document $D_j$.

[Expression 4]

$$idf_i = \log \frac{N}{Dfreq(i)} + 1 \qquad (4)$$

where Dfreq(i) denotes a number of documents in which the term $t_i$ appears (document frequency), and $idf_i$ denotes Dfreq(i) normalized by the total number of documents N. The tf·idf characteristic has many improved versions, but the above mentioned general definition is used here.

Now search input is expressed as a search vector q. This is also M-dimensional, and is given by the following Expression (5).

[Expression 5]

$$q = (q_1, q_2, \ldots, q_M)^T \qquad (5)$$

In Expression (5), $q_i$ is 1 if the keyword $t_i$ is included, and is 0 if not included.

In search processing, document $D_X$, of which similarity is the maximum, is searched out of the document set. For searching, the cosine distance determined by normalizing the inner product is normally used, as shown in Expression (6) and Expression (7), to normalize the number of words in a document.

[Expression 6]

$$x = \underset{j}{\text{argmax}}\ sim(q, w_j), \quad 1 \le j \le N \qquad (6)$$

where

[Expression 7]

$$sim(q, w_j) = \frac{q^T w_j}{|q||w_j|} = \frac{q_1 w_j^1 + \ldots + q_M w_j^M}{\sqrt{q_1^2 + \ldots + q_M^2} \times \sqrt{(w_j^1)^2 + \ldots + (w_j^M)^2}} \qquad (7)$$

Expression (7) itself, however, expresses a degree of similarity, and the cosine distance used as a scale to satisfy the system of axioms of distance is $1-sim(q, w_j)$.

Conventional example 1 is a search system based on the keyword weight vector shown in FIG. 4, embodying the prior art. FIG. 4 is a diagram depicting a system configuration to indicate a general search system, and is comprised of a terminal 20, web server 21 and search server 22. In this sample, a searching word, which is input from the terminal 20, is sent to the web server 21, and the searching word, which was input, is converted into a search vector q and is sent to the search server 22. The search server 22 searches according to the search vector q, and as a search result, a WWW document $D_X$ is sent to the web server 21 and the terminal 20.

This conventional example 1 is for simply outputting a search result, so a conventional example 2, which is a search system using evaluation values given by the following Expression (8) and Expression (9), to evaluate similarity considering user profile, is under consideration as an improvement of conventional example 1. Based on the evaluation values calculated by Expression (8) and Expression (9), display of the searched WWW documents is processed. In other words, the searched WWW documents are displayed in the sequence according to the evaluation values.

[Expression 8]

$$A\_score(q,w_j;p_k)=\lambda \text{sim}(q,w_j)+(1-\lambda)\text{sim}(p_k,w_j),$$
$$0\leq\lambda\leq 1 \quad (8)$$

where $p_k$ denotes a user profile of a user k.

[Expression 9]

$$p_k=(p_k^1, p_k^2, \ldots, p_k^M)^T \quad (9)$$

As shown above, the user profile of a user k is represented by the keyword weight vector. In this way, the WWW documents, searching word and user profile of a user k can also be represented by similar vectors.

To construct the user profile, the sum of Nw(j) in the WWW documents $D_j$ accessed in the past is determined, as shown in FIG. 3 (Data of the Technology Trend Group Planning and Research Division, Patent Administration Dept., Japan Patent Office: "Theme title: Creation of standard technologies on search engines", an overview of technical trends of WWW search engines, [online], [searched on Jan. 29, 2008], Internet <URL: http://www.jpo.go.jp/shiryou/s_sonota/hyoujun_gijutsu/search_engine/douko.htm>). By replacing Nw(j) in FIG. 3 with $w_j$, the following Expression (10) can be created.

[Expression 10]

$$p_k=\Sigma_{j\in documents\ visited\ by\ user\ k}w_j^T \quad (10)$$

Also as a format to add significance as an evaluation point, a conventional example 3, which is a search system using an evaluation value given by the following Expression (11), is under consideration.

[Expression 11]

$$B\_score(q,w_j;p_k,s_j)=\lambda A\_score(q,w_j;p_k)+(1-\lambda)s_j,$$
$$0\leq\lambda\leq 1 \quad (11)$$

where $s_j$ ($0\leq sj\leq 1$) denotes a significance of the WWW document $D_j$. The value $\lambda$ may differ from that in Expression (8).

FIG. 5 shows an operation of a standard search system according to the above conventional examples 2 and 3. As FIG. 5 shows, a user inputs a searching word from a terminal 20 (S101), and a search vector q is generated in a web server 21 (S102). The search vector q generated here is sent to the search server 22, and document IDs are output in the search server 22 in the sequence of higher similarity (S103). In the web server 21, a content to display WWW documents having higher similarity is generated (S104), and the content is displayed on the terminal 20 (S105).

Furthermore "Shohei Tsujimoto, Noriyuki Matsuda, So Harijima, Junichi Toyota, "Browsing support using context information—mounting on web and experimental evaluation thereof", Annual Conference of JSAI (11$^{th}$) Post Proceedings (Jun. 24, 1997), The Japanese Society for Artificial Intelligence, pp. 466-467" is known.

The above conventional search methods are based on the following assumptions. That is, (1) basic concept on page ranking, that a WWW document linked with a good quality WWW document has good quality, and (2) a keyword weight vector w of a WWW document and a personal profile p of a user are generated by sufficient information.

However, the above assumptions are not always applicable to a set of WWW documents viewed by a mobile terminal (hereafter called "mobile content"), and an appropriate search result cannot always be acquired by a prior art. FIG. 6 shows a structure of a mobile content. FIG. 6 is a diagram depicting a structure of mobile content in site A and site B. An independent server to provide the service here is called a "site". WWW documents viewed from personal computers are often mutually referred to (linked), but mobile content, which has of a tree structure directory within a server which provides the respective service, is in many cases independent, and normally without being linked between sites. For example, as FIG. 6 shows, site A and site B are independent from each other, and the respective content is not linked at all.

since sites are not linked to each other, the assumption that a WWW document linked with a good quality WWW document has a good quality, is not always established. Also WWW documents are short documents and do not contain many keywords, which is a different characteristic from WWW documents viewed on a PC. Another characteristic is that a number of dynamically generated WWW documents, such as news and transfer guides, is high. For example, in the case of site A in FIG. 6, newspapers and news are stored in a dynamic WWW document A, and transfer guide information is stored in a dynamic WWW document B. This information is updated or generated based on a user request. Therefore the content of a document existing in a predetermined URL is often different.

Because of this situation, it is difficult to determine significance of a several hundred word content without a link, considering the personal accessing history using such an evaluation value as the one shown in Expression (8) or Expression (11), and it is also difficult to represent a personal profile with a keyword weight vector, and as a consequence, it is difficult to present WWW documents that satisfy a user in a search.

SUMMARY OF THE INVENTION

With the foregoing in view, it is an object of the present invention to provide a document processing device and document processing method with which a search result, satisfactory to the user, can be provided, for WWW documents which are not linked with each other very much and which users do not access very frequently.

In order to solve these problem s, a document processing method of the present invention has: a collection step of collecting access history of a user; a document similarity computing step of computing document similarity, which indicates similarity between documents, by one user pattern which indicates a plurality of users who have accessed one document, and another user pattern which indicates a plurality of users who have accessed another document according to the access history collected in the collection step; a keyword weight vector correction step of correcting a keyword weight vector of the one document using the document similarity computed in the document similarity computing step; and an evaluation value calculation step of calculating an evaluation value for input information for searching, based on the keyword weight vector corrected in the keyword weight vector correction step.

According to the present invention, the access history of the user is stored, and the document similarity which indicates similarity between documents is computed by one user pattern which indicates a plurality of users who have accessed one document and another user pattern which indicates a plurality of users who have accessed another document, according to the access history, and the keyword weight vector in the one document is corrected using the computed document similarity. And the evaluation value for the input information for searching can be calculated based on the corrected keyword weight vector.

By this, the keyword weight vector can be interpolated based on the document having a user pattern similar to the user pattern of a user accessing documents, and the keyword weight vector of a document having low access quantity and link quantity, such as a document having mobile content, can be more accurate, and as a result, searching with a higher accuracy is implemented.

In the document processing method of the present invention, it is preferable that the keyword weight vector correction step further comprises a step of correcting a keyword weight vector in the above mentioned other document using the document similarity, and correcting a keyword weight vector in the above mentioned one document using the corrected keyword weight vector.

By this, the keyword weight vector in the other document is corrected and the keyword weight vector in the one document is corrected using this corrected keyword weight vector, and as a result, the keyword weight vector of a document with small document volume can be more accurate, and a more accurate search can be implemented.

The document processing method of the present invention further has: a user similarity computing step of computing a user similarity, which indicates similarity between users, by one document pattern which indicates a plurality of documents accessed by one user and another document pattern which indicates a plurality of documents accessed by another user, according to the access history collected in the collection step; and a user profile correction step of correcting a user profile which indicates characteristics of the above mentioned one user using the user similarity computed in the user similarity computing step, wherein the evaluation calculation step further has a step of calculating the evaluation value for the input information for searching based on the user profile of the one user corrected in the user profile correction step.

According to the present invention, the user similarity which indicates similarity between users is computed using one document pattern which indicates a plurality of documents accessed by one user and another document pattern which indicates a plurality of documents accessed by another user, and a user profile of the one user is corrected using the computed user similarity. Then, based on the corrected user profile of this one user, an evaluation value for input formation for searching can be calculated. By this, a user profile of a user who does not access much can be compensated for by a peripheral user, and a search result with high conformity for the user can be provided.

In the document processing method of the present invention, it is preferable that the user profile correction step further has a step of correcting a user profile of another user using the user similarity, and correcting the user profile of the above mentioned one user based on this corrected user profile.

By this, a user profile of a user, who does not access much, can be compensated for by a peripheral user, and a search result with high conformity for the user can be provided.

It is preferable that the document processing method further has an acquisition step of acquiring significance information which indicates significance attached to each document, wherein the evaluation value calculation step further has a step of calculating an evaluation value for the input information for searching, using the significance information acquired in the acquisition step.

According to the present invention, a user can acquire significance information which indicates significance attached to each document, and calculate an evaluation value for input information for searching using the acquired significance information. By this, the significance can be reflected on the evaluation value, and a more appropriate evaluation result can be provided.

In the document processing method of the present invention, it is preferable that the evaluation value calculation step further has a step of calculating an evaluation value using the corrected keyword weight vector when the corrected keyword weight vector in the above mentioned one document exists, and calculating an evaluation value using the keyword weight vector before correction when the corrected keyword weight value in the one document does not exist.

According to the present invention, whether the corrected keyword weight vector is used or the uncorrected keyword weight vector is used can be switched according to the presence of the corrected keyword weight vector, therefore even a document which is not held or collected in advance can be evaluated appropriately, and [this evaluation value] can be provided to the user.

It is preferable that the document processing method of the present invention further has an acquisition step of acquiring a document from a search server according to an access by a user, wherein accesses accepted in the acquisition step are collected in the collection step as the access history.

According to the present invention, the terminal at the user side need not have the access history collection function, therefore the configuration thereof can be simplified.

A document processing method of the present invention has: a collection step of collecting access history of a user; a document similarity computing step of computing a document similarity, which indicates similarity between documents by one user pattern which indicates a plurality of users who have accessed one document and another user pattern which indicates a plurality of users who have accessed another document, according to the access history collected in the collection step; a keyword weight vector correction step of correcting a keyword weight vector of the above mentioned one document using the document similarity computed in the document similarity computing step; an acquisition step of acquiring significance information which indicates a significance attached to each document; a significance correction step of distinguishing a first user pattern which indicates users who have accessed one document during a first time period, and a second user pattern which indicates users who have accessed one document during a second time period, according to the accesses of users collected in the collection step, and correcting the significance of the above mentioned one document based on the similarity of the first user pattern and the second user pattern and a number of accesses to the one document; and an evaluation value calculation step of calculating an evaluation value for input information for searching, based on the keyword weight vector corrected in the keyword weight vector correction step, and the significance information corrected in the significance correction step.

According to the present invention, a first user pattern which indicates users who have accessed one document during a first time period, and a second user pattern which indicates users who have accessed the one document during a second time period, are separately stored, and significance of the one document is corrected based on the similarity of the stored first user pattern and the second user pattern and the number of accesses to this one document. By this, significance of one document can be more appropriate. In other words, users who access a document change as time passes, and if a document of which user patterns are similar and which is accessed repeatedly by the same users, the document has high significance. Therefore the significance of this document is corrected so that the evaluation value thereof becomes high.

It is preferable that the document processing method of the present invention further has an output step of outputting the search result searched by the user according to the evaluation value calculated in the evaluation value calculation step.

By this invention, a search result based on the calculated evaluation value can be output, and a search result which the user can clearly see, such as outputting documents sequentially from one having a higher evaluation value, can be provided.

A document processing method of the present invention has: a first generation step of generating a user profile based on a keyword weight vector that is to be a reference value; a second generation step of generating a new keyword weight vector based on the user profile generated in the first generation step and the keyword weight vector that is to be a reference value; a third generation step of generating a new user profile based on the new keyword weight vector generated in the second generation step; a user profile similarity generation step of computing similarity between the new user profile generated in the third generation step and the user profile generated immediately before the new user profile; and an evaluation value calculation step of calculating an evaluation value based on the keyword weight vector and user profile when the similarity computed in the user profile similarity generation step becomes a predetermined value or more.

According to the present invention, a user profile is generated first based on a keyword weight vector to be a reference value, then a new keyword vector is generated based on the generated user profile and the keyword weight vector to be the reference value, and a new user profile is generated based on the new keyword weight vector. Then similarity of the new user profile and the user profile generated immediately before the new user profile is computed, and it is judged whether this similarity has a predetermined value or more. The user profile and keyword weight vector are repeatedly generated until the similarity has a predetermined value or more, and the evaluation value is calculated based on the keyword weight vector and user profile when the computed similarity becomes a predetermined value or more.

By generating the keyword weight vector and user profile to be interdependent like this, the user profile propagates into the keyword weight vector, whereby the user profile and keyword weight vector are smoothed and interpolated. Therefore the keyword weight vector of a document having small document volume, such as a mobile content, can be more accurate. A user profile of a user who does not access much can be compensated for by a peripheral user, and a search result with high conformity for the user can be provided.

It is preferable that the document processing method according to the present invention further has a judgment step of judging whether the similarity generated in the user profile similarity generation step is a predetermined value or more, wherein the evaluation value calculation step further has a step of calculating the evaluation value based on the keyword weight vector and user profile when the similarity computed in the user profile similarity generation step becomes a predetermined value or more.

According to the present invention, the evaluation value can be calculated based on the keyword weight vector and user profile when the similarity computed in the user profile similarity generation step becomes a predetermined value or more, whereby a search result with high conformity for the user can be provided.

The present invention cannot only be described as an invention for the document processing method as above, but can also be described as an invention for a document processing device, search system and document processing programs, as described herein below. These are substantially the same invention, only the categories are different, and implement similar functions and effects.

A document processing device of the present invention has: access history collection means for collecting access history of a user; document similarity computing means for computing a document similarity, which indicates similarity between documents by a user pattern which indicates a plurality of users who have accessed one document and a user pattern which indicates a plurality of users who have accessed another document, according to the access history collected by the collection means; keyword weight vector correction means for correcting a keyword weight vector of the one document, using the document similarity computed by the document similarity computing means; and evaluation value calculation means for calculating an evaluation value for input information for searching, based on the keyword weight vector corrected by the keyword weight vector correction means.

A search system of the present invention has: a user terminal for storing access history; an information collection device for generating a keyword weight vector of a document accessed by the user terminal; and the above mentioned document processing device for acquiring the access history of the user terminal and the keyword weight vector generated by the information collection device.

A document processing program of the present invention has: a collection module for collecting access history of a user; a document similarity computing module for computing a document similarity, which indicates similarity between documents, by a user pattern which indicates a plurality of users who have accessed one document and a user pattern which indicates a plurality of users who have accessed another document, according to the access history collected by the collection module; a keyword weight vector collection module for correcting a keyword weight vector of the one document, using the document similarity computed by the document similarity computing module; and an evaluation value calculation module for calculating an evaluation value for input information for searching, based on the keyword weight vector corrected by the keyword weight vector correction module.

A document processing device of the present invention has: primary WWW document extraction means for extracting WWW documents according to a searching word; user extraction means for extracting a user set of users who have accessed the WWW documents extracted by the primary WWW document extraction means; secondary WWW document extraction means for extracting a WWW document set of WWW documents accessed by the users extracted by the user extraction means; and significance calculation means for calculating significance of the WWW documents extracted by the primary WWW document extraction means based on a degree of accesses by users to the WWW document set extracted by the secondary WWW document extraction means.

According to the present invention, a user set of users who have accessed the WWW document according to a searching word is extracted, and a set of WWW documents accessed by the users is extracted. And significance of the WWW documents can be calculated based on a degree of accesses by users to the extracted WWW document set. By this, significance of a WWW document having a small access quantity and link quantity, such as a mobile content, can be accurately calculated, and an accurate search can be implemented.

In the document processing device in the present invention, it is preferable that the significance calculation means calculates the significance of a WWW document based on a degree of accesses by each user in the user set extracted by the user extraction means.

According to the present invention, the significance of the WWW document can be calculated based on a degree of accesses by each user in the extracted user set, and significance can be accurately calculated, which implements accurate search.

A document processing device of the present invention has: primary WWW document extraction means for extracting WWW documents according to a searching word; user extraction means for extracting a user set of users who have accessed the WWW documents extracted by the primary WWW document extraction means; data structure holding means for holding data for which reference relationships among the WWW documents can be managed as a directed graph; secondary WWW document extraction means for extracting other WWW documents which each WWW document extracted by the primary WWW document extraction means refers to, and other WWW documents which refer to each WWW document, based on the data stored in the data structure holding means; and significance calculation means for calculating significance of the WWW documents extracted by the primary WWW document extraction means based on a degree of accesses by the users extracted by the user extraction means to the WWW document set extracted by the secondary WWW document extraction means.

According to the present invention, a user set of users who have accessed the WWW documents according to the searching word is extracted, and other WWW documents which each extracted WWW document refers to and other WWW documents which refer to each WWW document are extracted based on the data which can manage the reference relationships among the WWW documents as a directed graph. And significance of the WWW documents can be calculated based on a degree of accesses by the users to the extracted WWW document set. By this, significance of a WWW document can be accurately calculated, and an accurate search can be implemented.

A document processing device of the present invention has: access history holding means for holding an access history to a WWW document by a plurality of users; data structure holding means for holding data for which reference relationships among WWW documents can be managed as a directed graph; primary WWW document extraction means for extracting WWW documents according to a searching word; user extraction means for extracting a user set of users who have accessed the WWW documents extracted by the primary WWW document extraction means from the access history holding means; secondary WWW document extraction means for extracting other WWW documents which each WWW document extracted by the primary WWW document extraction means refers to, and other WWW documents which refer to each WWW document, based on the data stored in the data structure holding means, and extracting one node set by adding the user set extracted by the user extraction means and the WWW document set of the extracted WWW documents; and significance calculation means for calculating significance of the WWW documents by weighting a degree of being referred to among the WWW documents in the node set extracted by the secondary WWW document extraction means and a degree of accesses by each of the users to each of the WWW documents respectively.

According to the present invention, data that can be managed as a directed graph among WWW documents is held in advance, and a user set of users who have accessed a WWW document extracted according to a searching word is extracted. Also other WWW documents which each WWW document refers to and other WWW documents which refer to each WWW document are extracted based on the data which allows managing the reference relationships among the WWW documents as a directed graph, and one node set is extracted by adding the user set of extracted users and the WWW document set of extracted WWW documents. Then the significance of the WWW documents is calculated by weighting a degree of being referred to among the WWW documents in the extracted node set and a degree of accesses by each user to each WWW document respectively. By this, the significance of the WWW document can be accurately calculated, and an accurate search can be implemented.

A document processing device of the present invention has: data structure holding means for holding data for which reference relationships among WWW documents can be managed as a directed graph; primary WWW document extraction means for extracting WWW documents according to a searching word; user extraction means for extracting a user set of users who have accessed the WWW documents extracted by the extraction means from the access history holding means; secondary WWW document extraction means for extracting other WWW documents which each WWW document extracted by the primary WWW document extraction means refers to, and other WWW documents which refer to each of the WWW documents, based on the data stored in the data structure holding means; hub score calculation means for calculating a hub score which indicates a degree of accesses by each user of the user set extracted by the user extraction means to each WWW document extracted by the secondary WWW document extraction means; and significance calculation means for calculating significance based on a degree of matching a visit vector of users who have visited a WWW document included in any of the WWW documents and the hub score calculated by the hub score calculation means.

According to the present invention, a user set of users who have accessed the extracted WWW document according to a searching word is extracted, and other WWW documents which each extracted WWW document refers to and other WWW documents which refer to each of the WWW documents are extracted based on the data which allows managing the reference relationships among the WWW documents as a directed graph. Each user of the extracted user set calculates a hub score which indicates a degree of accesses to each extracted WWW document. Then the significance is calculated based on a degree of matching of a visit vector of users who have visited the WWW document, included in the WWW document, and the hub score. By this, the significance of the WWW document can be accurately calculated, and an accurate search can be implemented.

The present invention can not only be described as a document processing device, as mentioned above, but can also be described as a document processing method, as mentioned herein below. In this case, the functional effects thereof are the same as those of the document processing device.

A document processing method of the present invention has: a primary WWW document extraction step of extracting WWW documents according to a searching word; a user extraction step of extracting a user set of users who have accessed the WWW documents extracted in the primary WWW document extraction step; secondary WWW document extraction step of extracting a WWW document set of WWW documents accessed by users extracted in the user extraction step; and significance calculation step of calculating significance of the WWW documents extracted in the primary WWW document extraction step based on a degree of accesses by the users to the WWW document set extracted in the secondary WWW document extraction step.

The document processing method of the present invention is a document processing method for a document processing device having data structure holding means for holding data for which reference relationships among WWW documents can be managed as a direct graph, having: a primary WWW document extraction step of extracting WWW documents according to a searching word; a user extraction step of extracting a user set of users who have accessed the WWW documents extracted in the primary WWW document extraction step; a secondary WWW document extraction step of extracting other WWW documents which each WWW document extracted in the primary WWW document extraction step refers to, and other WWW documents which refer to each of the WWW documents, based on the data stored in the data structure holding means; and a significance calculation step of calculating significance of the WWW documents extracted in the primary WWW document extraction step based on a degree of accesses by the users extracted in the user extraction step to the WWW document set extracted in the secondary WWW document extraction step.

A document processing method of the present invention is a document processing method for a document processing device having access history holding means for holding history of access to a WWW document by a plurality of users, and data structure holding means for holding data for which reference relationships among WWW documents can be managed as a directed graph, having: a primary WWW document extraction step of extracting WWW documents according to a searching word; user extraction step of extracting a user set of users who have accessed the WWW documents extracted in the primary WWW document extraction step from the access history holding means; secondary WWW document extraction step of extracting other WWW documents which each WWW document extracted in the primary WWW document extraction step refers to, and other WWW documents which refer to each of the WWW documents, based on the data stored in the data structure holding means, and extracting one node set by adding the user set extracted in the user extraction step and the extracted WWW document set of WWW documents; and significance calculation step of calculating significance of the WWW documents by weighting a degree of being referred to among the WWW documents in the node set extracted in the secondary WWW document extraction step and a degree of accesses by each of the users to each of the WWW documents respectively.

A document processing method of the present invention is a document processing method for a document processing device having access history holding means for holding history of access to a WWW document by a plurality of users, and data structure holding means for holding data for which reference relationships among WWW documents can be managed as a directed graph, having: a primary WWW document extraction step of extracting WWW documents according to a searching word; a user extraction step of extracting a user set of users who have accessed the WWW documents extracted in the primary WWW document extraction step from the access history holding means; a secondary WWW document extraction step of extracting other WWW documents which each WWW document extracted in the primary WWW document extraction step refers to, and other WWW documents which refer to each of the WWW documents, based on the data stored in the data structure holding means; a hub score calculation step of calculating a hub score which indicates a degree of accesses by each user of the user set extracted in the user extraction step to each WWW document extracted in the secondary WWW document extraction step; and a significance calculation step of calculating significance based on a degree of matching of a visit vector of users who have visited a WWW document included in any of the WWW documents and the hub score calculated in the hub score calculation step.

According to the present invention, the keyword weight vector can be interpolated based on documents having a pattern similar to the user pattern of a user accessing documents, and the keyword weight vector of a document having low access quantity and link quantity, such as mobile content, can be more accurate, and as a result, searching with more accuracy is implemented.

According to the present invention, significance of WWW documents having a small access quantity and link quantity, such as mobile content, can be accurately calculated based on a degree of accesses by the user, and an accurate search can be implemented.

BRIEF DESCRIPTION OF THE DRAWINGS

FIG. 9 shows an example of a WWW document;

FIG. 10 shows an output example from an information collection device 400;

FIG. 27 is a flow chart depicting a processing of an authority score calculation unit 707a; and FIG. 28 is a block diagram depicting functions of a document processing device 700b according to a sixth embodiment.

DESCRIPTION OF THE PREFERRED EMBODIMENTS

Embodiments of the present invention will now be described with reference to the accompanying drawings. Whenever possible, identical portions are denoted with a same reference symbol, for which redundant description is omitted.

First Embodiment

Figure 7:
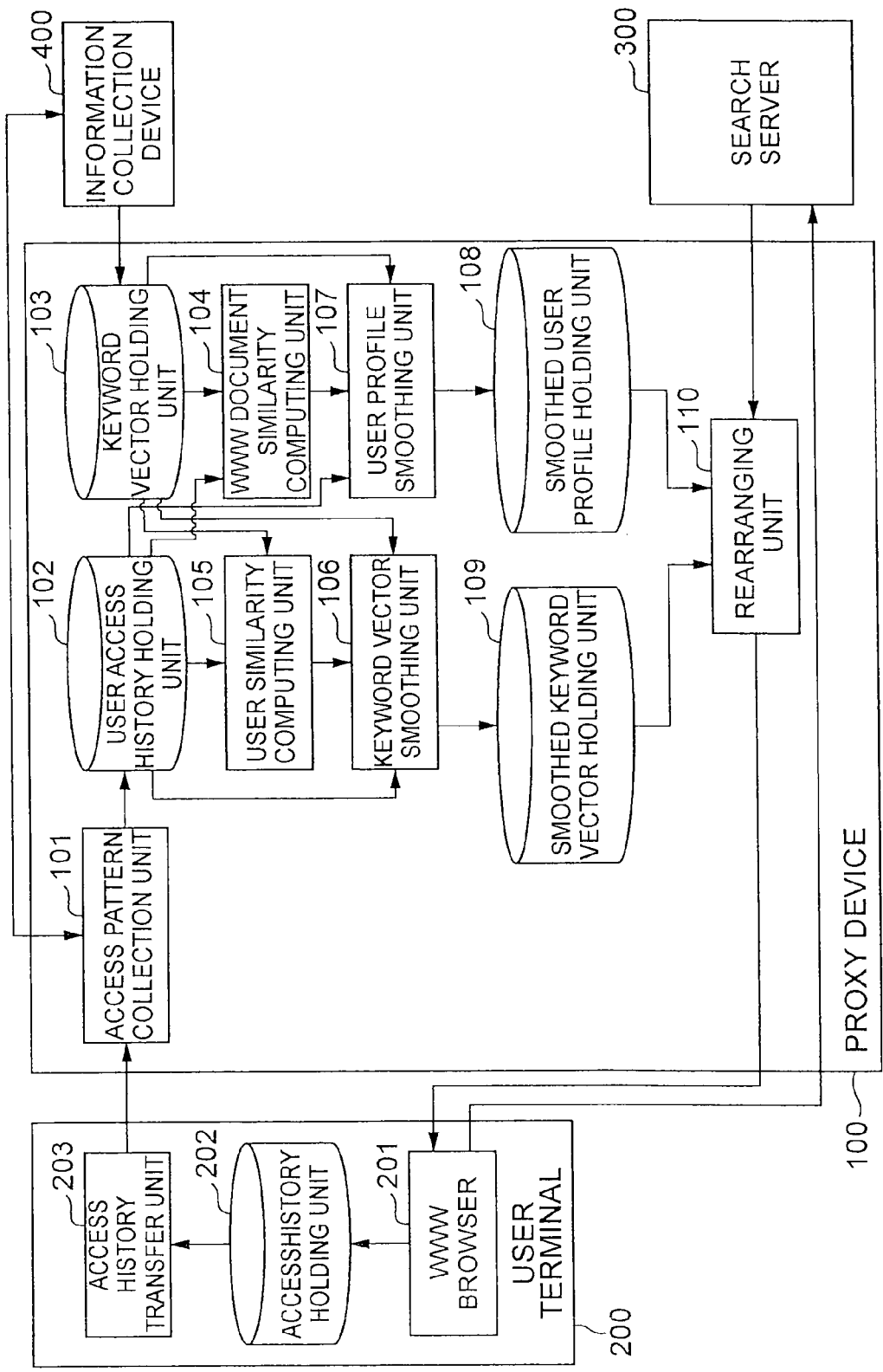
FIG. 7 is a system configuration diagram depicting a functional configuration of an information processing system using a proxy device 100 of a first embodiment.

FIG. 7 is a system configuration diagram depicting a functional configuration of an information processing system using a proxy device 100 of the present embodiment, and this information processing system is comprised of a proxy device 100, user terminal 200, search server 300 and information collection device 400. In this system, the user terminal 200 outputs a search request to the search server 300 via the proxy device 100. The search server 300 executes search processing according to the search request, and replies with the search result to the user terminal 200 via the proxy device 100. The information collection device 400 collects documents data such as WWW documents based on the access history of the user terminal 200, and generates a keyword weight vector. The generated keyword weight vector is output to the proxy device 100, and is held there.

The proxy device 100 is further comprised of an access pattern collection unit 101, user access history holding unit 102, keyword vector holding unit 103, WWW document similarity computing unit 104, user similarity computing unit 105, keyword vector smoothing unit 106, user profile smoothing unit 107, smoothed user profile holding unit 108, smoothed keyword vector holding unit 109 and rearranging unit 110. The user terminal 200 is further comprised of a WWW browser 201, access history holding unit 202 and access history transfer unit 203. This user terminal 200 represents a user or a plurality of users, and about 1 million units are assumed in this system. A user may user a plurality of user terminals. A number of users is represented by the constant K herein below.

Figure 8:
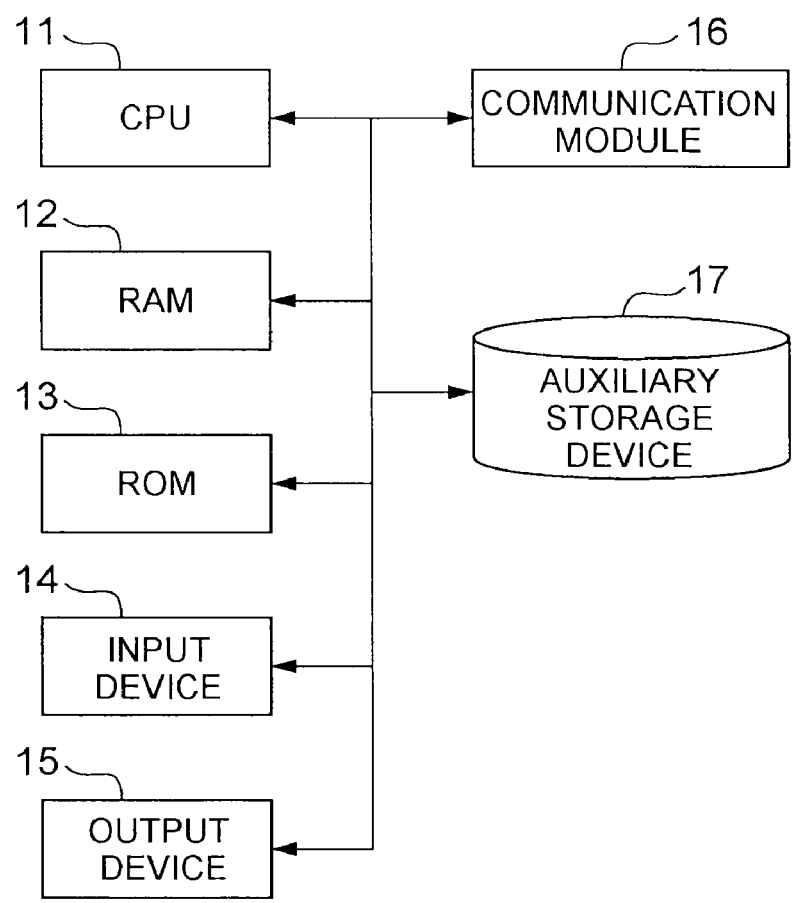
FIG. 8 is a hardware block diagram of the proxy device 100.

The proxy device 100 here is constructed by the hardware shown in FIG. 8. FIG. 8 is a hardware block diagram of the proxy device 100. The proxy device 100 shown in FIG. 7 is physically constructed as a computer system, including a CPU 11, RAM 12 and ROM 13, which are main storage devices, an input device 14, such as a keyboard and mouse, an output device 15, such as a display, a communication module 16 which is a transmission/reception device, such as a network card, and an auxiliary storage device 17, such as a hard disk, as shown in FIG. 8. Each function in FIG. 7 is implemented by having such hardware as CPU 11 and RAM 12, shown in FIG. 8, read a predetermined computer software, whereby the input device 14, output device 15 and communication module 16 are operated under control of the CPU 11, and data is read or written in the RAM 12 and auxiliary storage device 17. The user terminal 200, search server 300 and information collection device 400 also have a similar hardware configuration, so that [the system] can execute various functions according to a program. Each functional block will now be described based on the functional blocks shown in FIG. 7.

The access pattern collection unit 101 is a portion to collect access patterns accessed in the user terminal 200 in a predetermined period. The access pattern here means access destination information, such as a URL, where a WWW document, which the user attempted to access, is located. The access destination information acquired here is output to the information collection device 400. The information collection device 400 can acquire the WWW document according to the access destination information, as mentioned later. For example, the information collection device 400 can acquire a WWW document shown in FIG. 9. FIG. 9 shows an example of a WWW document, and shows a WWW document on portable telephones. In FIG. 9, such information as navigation by purpose is described, where an anchor is formed in the underline portion, and the user can access the WWW document in the lower level by clicking on the anchor.

The access pattern collection unit 101 acquires access pattern information indicating a plurality of WWW documents which the user terminal 200 accessed in a predetermined period from the information collection device 400, and calculates an access user vector $u_j$ (K×1 vectors) ($1 \leq j \leq N$) shown in Expression (12), and a visit WWW document vector $v_k$ (N rows 1 column vector) ($1 \leq k \leq K$) shown in Expression (13). The results are stored in the user access history holding unit 102.

Here the access user vector $u_j$ is defined as a vector which is $u_j^k = 1$ if the WWW document $D_j$ has been accessed by the user k, and is 0 otherwise.
[Expression 12]

$$u_j = (u_j^1, u_j^2, \ldots, u_j^K)^T \qquad (12)$$

This indicates a reader list (user pattern) of the WWW document Dj. K denotes a number of users.

In the same way, the visit WWW document vector $v_k$ is defined as a vector which is $v_k^j = 1$ if the user k has accessed the WWW document $D_j$, and is 0 otherwise.
[Expression 13]

$$v_k = (v_k^1, v_k^2, \ldots, v_k^N)^T \qquad (13)$$

This indicates the WWW document list accessed by the user k. N denotes a number of WWW documents.

The user access history holding unit 102 is a portion to store the access destination information, visit WWW document vector $v_k$, access user vector $u_j$ collected by the access pattern collection unit 101, and access pattern information indicating a WWW document (including significance) acquired based on the access destination information.

The information collection device 400, on the other hand, acquires the WWW document according to the access destination information which is output from the access pattern collection unit 101. Then morphological analysis is performed on the acquired WWW document $D_j$, words included in the WWW document $D_j$ are extracted, and the keyword weight vector $w_j$ is generated based on the extracted words. The keyword weight vector $w_j$ can be generated according to Expression (1) to Expression (4), as mentioned above.

According to the present embodiment, a word included in the WWW document is not directly converted into a keyword weight vector, but is replaced with a broader term using a keyword from a thesaurus, embracing a range of synonyms. For example, "professional baseball" is converted into "baseball". FIG. 10 shows an output example from the information collection device 400. As FIG. 10 shows, words included in the WWW document $D_j$ which the information collection device 400 acquired are output in correspondence with a keyword, certainty, score and field. For example, if a keyword is "docomo", "portable telephone" is derived. The score, which is appearance frequency $tf_j^i$ ($1 \leq i \leq M$) is calculated, and based on this score, a position element $w_j^i$ of the keyword weight vector $w_j$ is calculated as certainty "1.000". M is a number of broader terms.

The keyword to which a word is converted is a broader term, and [this processing] is performed for an entire WWW document accessed by the user, and the tf·idf characteristic is calculated to determined the keyword weight vector $w_j$. Then $w_j$ is normalized to be a vector of magnitude 1. Normalization of the keyword weight vector and user profile was not mentioned as a tf·idf characteristic, but according to the present embodiment, [vectors] are always handled as normalized vectors having a magnitude of 1.

The keyword vector holding unit 103 is a portion to store the keyword weight vector $w_j$ given by Expression (1) generated in the information collection device 400 for each user (for each user terminal 200).

The WWW document similarity computing unit 104 is a portion to compute the degree of matching of an access user vector $u_j$ of a user accessing one WWW document $D_j$ and an access user vector $u_{je}$ of a user accessing another WWW document $D_{je}$, and computes similarity between the WWW documents by computing the degree of matching of the access user vectors u. The degree of matching of the access user vectors is computed by the following Expression (14) (cos measure).

[Expression 14]

$$\text{sim}(u_j, u_{je}) \tag{14}$$

This Expression (14) is used as a scale to indicate a degree of matching of user patterns [of the users] who visited the WWW document $D_j$ and WWW document $D_{je}$, and is used for judging similarity between WWW documents.

The user similarity computing unit 105 is a portion to compute a degree of matching of a visit document vector $v_k$ of a WWW document accessed by one user k, and a visit document vector $v_{ke}$ of a WWW document accessed by another user ke, so that similarity between the users can be judged by computing a degree of matching of these visit document vectors. The degree of matching of visit document vectors v is computed by the following Expression (15).

[Expression 15]

$$\text{sim}(v_k, v_{ke}) \tag{15}$$

This Expression (15) is used as a scale to indicate similarity between the user k and user ke in the document pattern of the accessed WWW documents.

The keyword vector smoothing unit 106 is a portion to smooth a keyword weight vector in one WWW document being held in the keyword vector holding unit 103, and is a portion to correct the keyword weight vector $w_j$ using a WWW document of which access pattern is similar to that of this one WWW document. Thereby even if an accurate keyword weight vector cannot be calculated because the number of accesses to the one WWW document is insufficient, the keyword weight vector can be interpolated using another similar WWW document, and as a result, a more accurate keyword vector can be calculated.

In concrete terms, the keyword vector smoothing unit 106 smoothes and interpolates the keyword weight vector $w_j$ using the above Expression (14) and the following Expression (16), so as to generate the smoothed keyword weight vector $w_j'$.

[Expression 16]

$$w_j' = w_j + \varepsilon \sum_{je=1}^{N} sim(u_j, u_{je}) w_{je}, \quad 0 \leq \varepsilon \leq 1/N \tag{16}$$

Here $\varepsilon$ denotes an experimentally defined real number. $\varepsilon$ is 1/N in the present embodiment.

The use profile smoothing unit 107 is a portion to generates a user profile $p_k$ using a keyword weight vector $w_j$ in one WWW document held in the keyword vector holding unit 103 and a visit document vector $v_k$ stored in the user access history holding unit 102, and perform smoothing and interpolation of the user profile $p_k$ for the generated user profile $p_k$, and is also a portion to correct a user profile using an access pattern of another user which is close to the access pattern of the above mentioned one user. Thereby even if an accurate user profile cannot be calculated because of the number of samples is insufficient in the visit WWW document vector of one user, the user profile can be interpolated and corrected using a visit WWW document vector of another user having a similar [access pattern], and as a result, a more accurate user profile can be calculated.

More concretely, the user profile smoothing unit 107 generates a user profile according to Expression (17). The user profile $p_k$ is generated by multiplying a matrix W (see Expression (18)) acquired by arranging the keyword weight vector $w_j$, which is a column vector, by the visit WWW document vector for initialization.

[Expression 17]

$$p_k = W v_k \tag{17}$$

[Expression 18]

$$W = [w_1 \, w_2 \ldots w_N] \tag{18}$$

The user profile smoothing unit 107 performs smoothing and interpolation of the user profile $p_k$, initialized and generated like this, according to Expression (19).

[Expression 19]

$$p_k' = p_k + \varepsilon \sum_{ke=1}^{K} sim(v_k, v_{ke}) p_{ke}, \quad 0 \leq \varepsilon \leq 1/N \tag{19}$$

As a transformation of Expression (19), the following Expression (20) can also be used.

[Expression 20]

$$p_k' = p_k + \varepsilon \sum_{ke=1}^{K} sim(p_k, p_{ke}) p_{ke}, \quad 0 \leq \varepsilon \leq 1/N \tag{20}$$

In this case, interpolation is performed not using the similarity of the accessed WWW documents, but the similarity of keywords in the accessed WWW documents.

The smoothed user profile holding unit 108 stores the smoothed user profile $p_j'$, which was smoothed and interpolated by the user profile smoothing unit 107.

The smoothed keyword vector holding unit 109 stores the smoothed keyword weight vector $w_j'$, which was smoothed and interpolated by the keyword vector smoothing unit 106.

The rearranging unit 110 is a portion to perform rearranging processing to the top X (for example X=20) WWW documents which were searched by the search server 300 using the search vector q based on the searching word which was input via the user terminal 200, and were output as WWW document search candidates. In concrete terms, [the WWW documents] may be displayed sequentially from the top rank based on the evaluation value calculated according to the above Expression (8), or significance $s_j$ may be added, as shown in the following Expression (21). The rearranging unit 110 may store the searched WWW documents temporarily in a WWW document storage unit (not illustrated), and have the keyword vector holding unit 103 store the keyword weight vector.

[Expression 21]

$$B\_score(q, w_j'; p_k', s_j) = \lambda A\_score(q, w_j'; p_k') + (1-\lambda)s_j, \quad 0 \leq \lambda \leq 1 \quad (21)$$

$\lambda$ is 0.9 in the present embodiment.

In the present embodiment, it is assumed that all the WWW documents acquired from the search server 300 are stored in the user access history holding unit 102. It is, for certain, possible that the search server 300 could be from another provider, and a WWW document, which does not exist in the proxy device 100, is acquired as a search result, but exceptions can be handled by using $w_j$, without smoothing, for calculation of this WWW document. In other words, the proxy device 100 has a judgment unit to judge whether the keyword weight vector of the collected WWW document is stored in the smoothed keyword vector holding unit 109, or whether the WWW document is already stored. And if a WWW document of which keyword weight vector is stored in the proxy device 100 is acquired as a search result, the proxy device 100 calculates an evaluation value using Expression (21), and if a WWW document of which keyword weight vector is not stored in the proxy device 100 is acquired as a search result, the proxy device 100 may calculate the evaluation value using Expression (11). Only one of the keyword weight vector and user profile may be smoothed.

Now the user terminal 200 will be described. As FIG. 7 shows, the user terminal 200 is comprised of a WWW browser 201, access history holding unit 202 and access history transfer unit 203. The user terminal 200 is a communication terminal, such as a portable telephone and personal computer, which can be connected to the Internet, and has a configuration similar to FIG. 8. In other words, [the user terminal 200] is comprised of a CPU, RAM, ROM and other components, operates the WWW browser 201 by operating an input device, and can access the Internet via the proxy device 100. Each composing element will now be described.

The WWW browser 201 is an application to access WWW documents held on the Internet. The user of the user terminal 200 can access a desired WWW documents by operating the WWW browser 201. In the present embodiment, the WWW browser 201 can access the WWW documents for searching, output a search request to a search server via the proxy device 100, receive the search result via the proxy device 100, and display it for the user.

The access history holding unit 202 is a portion to store access destination information (URL) for which the WWW browser 201 performed access processing.

The access history transfer unit 203 is a portion to send the access destination information stored in the access history holding unit 202 to the proxy device 100 in a predetermined cycle or timing.

Figure 11:
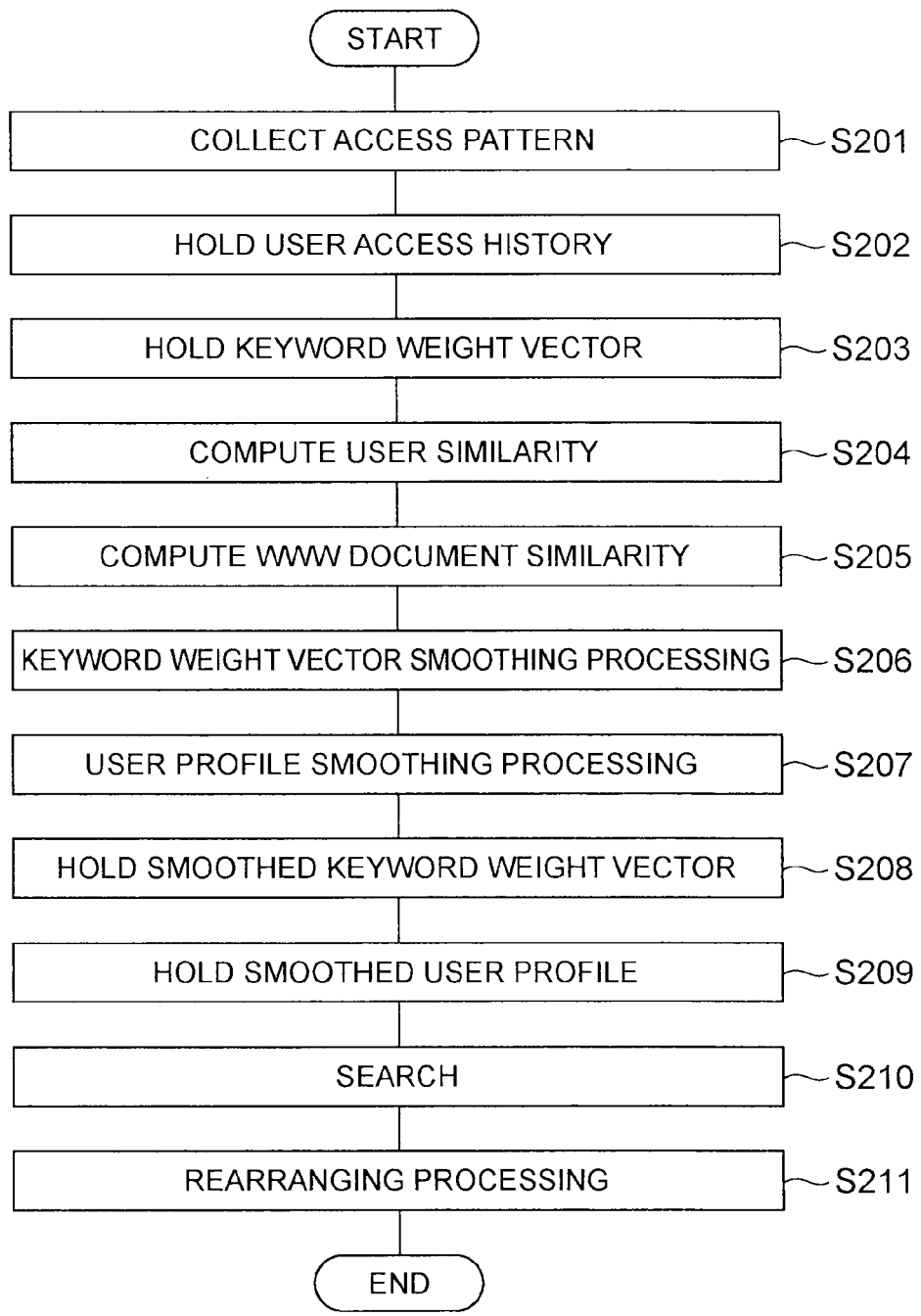
FIG. 11 is a flow chart depicting an operation of the proxy device 100 according to the present embodiment.

Operation of the proxy device 100 of the present embodiment will now be described. FIG. 11 is a flow chart depicting operation of the proxy device 100 of the present embodiment. As FIG. 11 shows, an access pattern of the access destination information which each user terminal 200 accessed in a predetermined period is collected by the access pattern collection unit 101 (S201). Then the access destination information collected by the access pattern collection unit 101, access user vector $u_j$ and visit WWW document vector $v_k$ generated by the access pattern collection unit 101, and the WWW documents acquired by the information collection device 400, are stored in the user access history holding unit 102 (S202). Then the keyword weight vector $w_j$ generated in the information collection device 400 is stored in the keyword vector holding unit 103 (S203). The sequence of S202 and S203 may be reversed.

Then the user similarity computing unit 105 performs the user similarity computation (S204). The WWW document similarity computation is also performed (S205). The computed user similarity and WWW document similarity are smoothed and interpolated by the keyword vector smoothing unit 106 and user profile smoothing unit 107, and the smoothed keyword weight vector and smoothed user profile are generated (S206, S207). The generated smoothed keyword weight vector and smoothed user profile are stored in the smoothed keyword vector holding unit 109 and smoothed user profile holding unit 108 (S208, S209).

When a search request comes from the user terminal 200, [the proxy device 100] requests a search to the search server 300 according to the request (S210), and when a search result is received from the search server 300, the rearranging unit 110 performs rearrangement processing on the search result using the smoothed keyword weight vector and smoothed user profile (S211).

The proxy device 100 of the present embodiment has an effect to improve the statistic reliability of the WWW document and user profile. In statistical language processing, a keyword which is supposed to appear may not be included in the WWW document if the number of observed data is not large enough. An object of the proxy device 100 of the present embodiment is to compensate keywords in a personal profile, which is difficult to directly observe, and keywords of a WWW document of which number of words is small.

In particular, a WWW document which functions as a parent directory and which does not have sufficient keywords, or which is mostly images and has no keywords, can be interpolated with keywords of a document that can be visited simultaneously.

Figure 1:
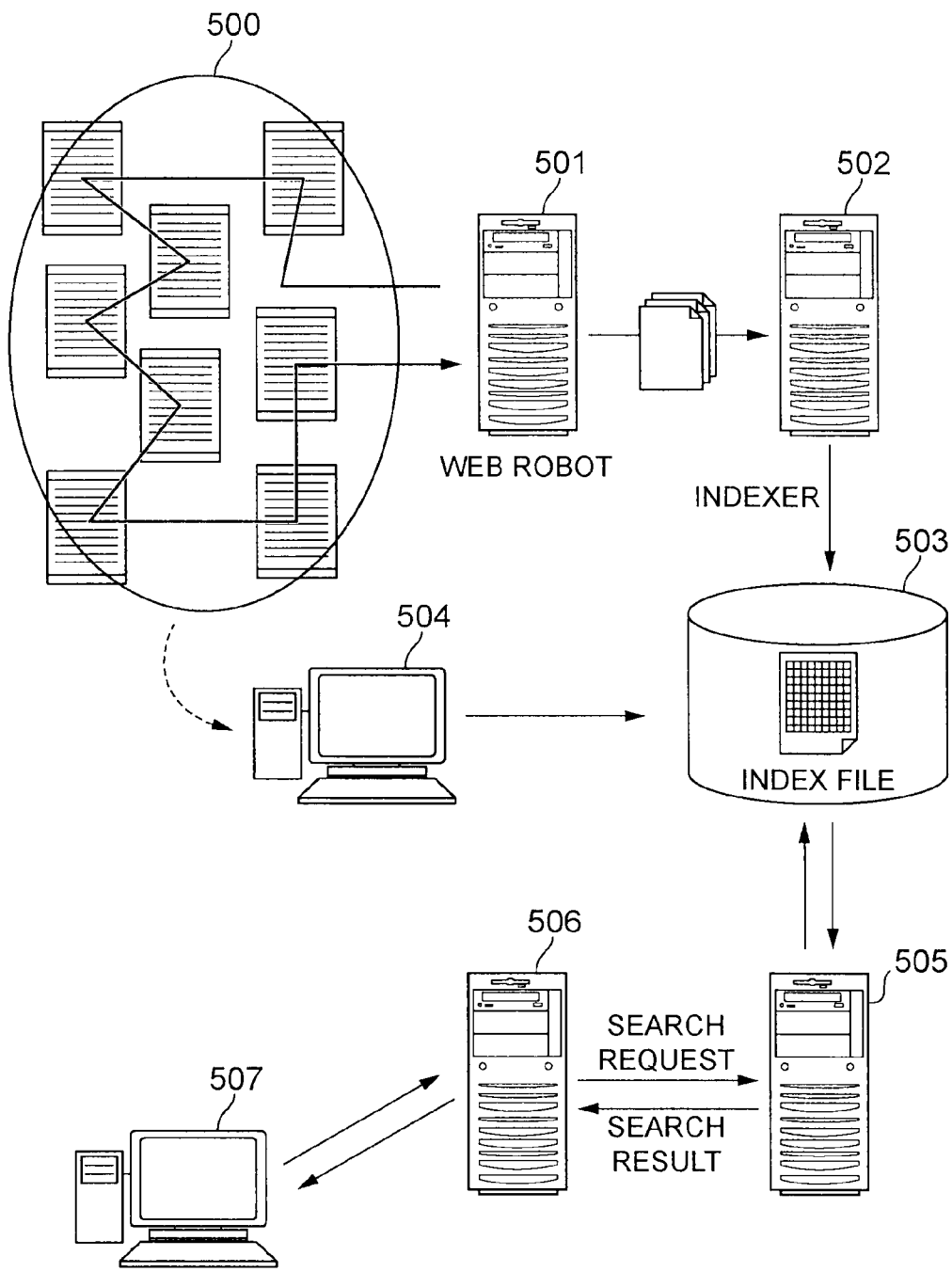
FIG. 1 is a system configuration diagram depicting a configuration of a search system according to a prior art.
Figure 2:
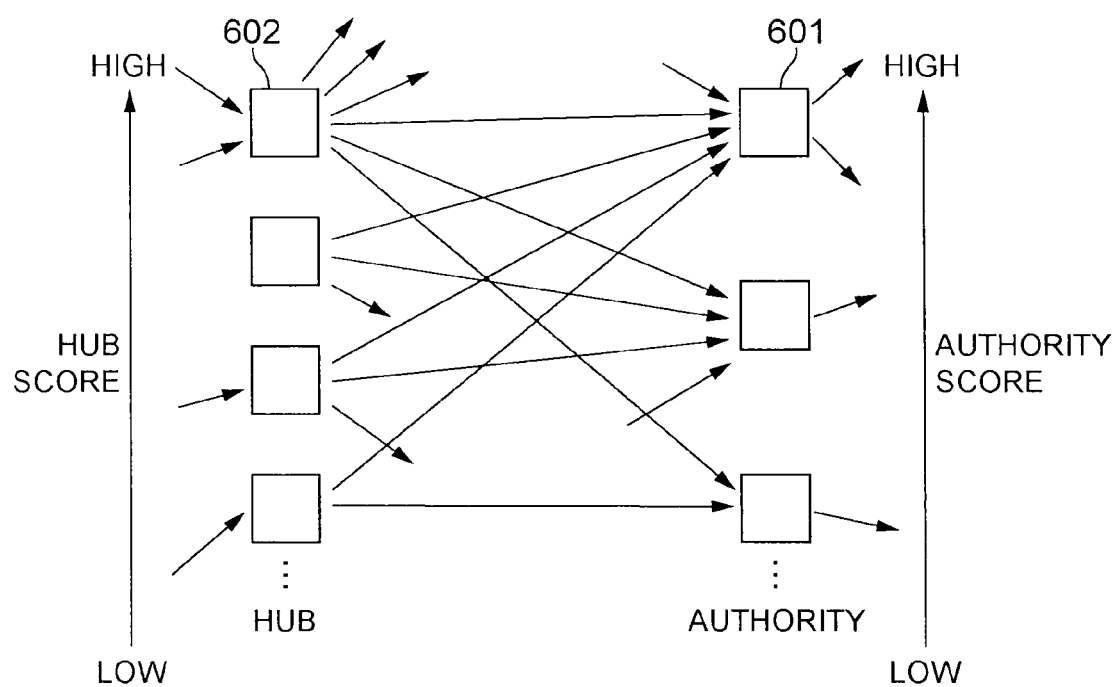
FIG. 2 is a conceptual diagram depicting a concept of an HITS algorithm.
Figure 3:
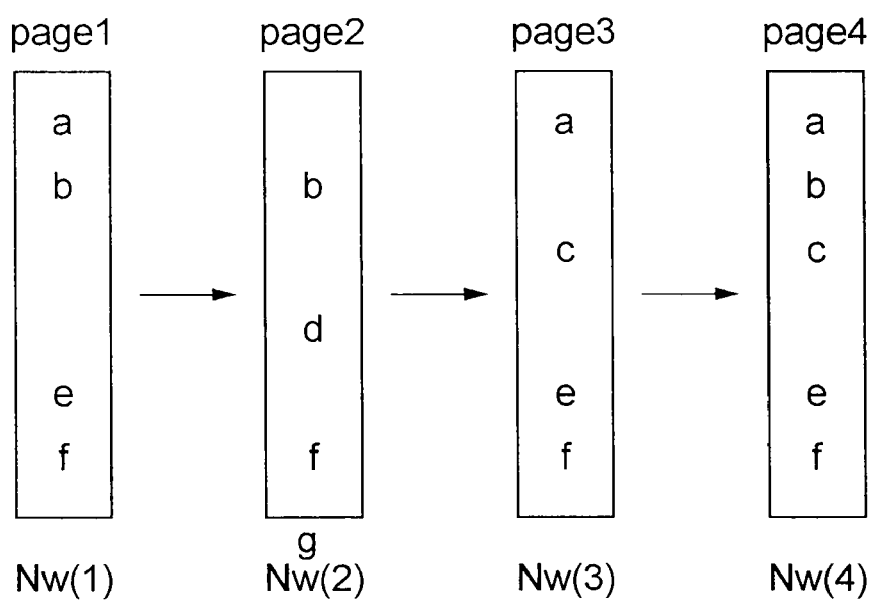
FIG. 3 is a diagram depicting a transition state of web pages accessed by a user.
Figure 4:
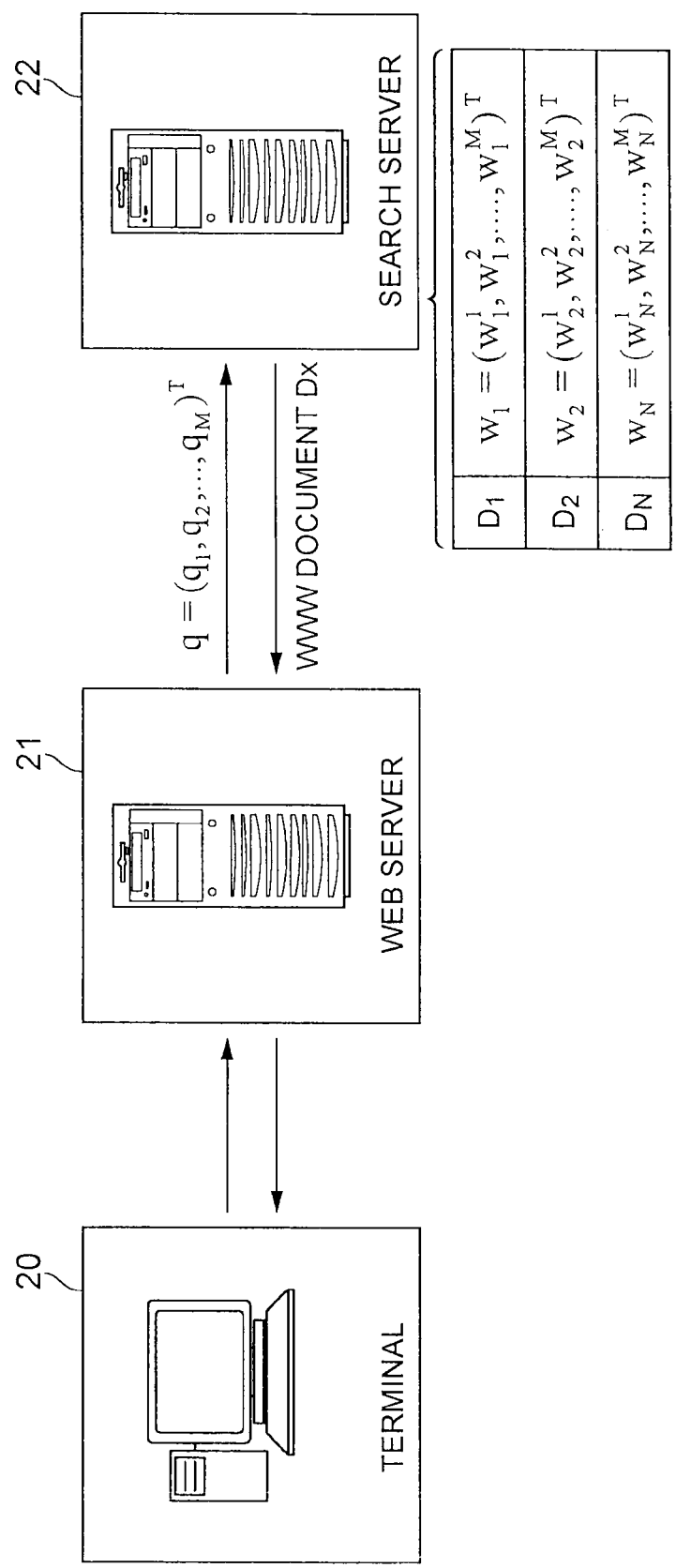
FIG. 4 is a system configuration diagram depicting a configuration of a search system.
Figure 5:
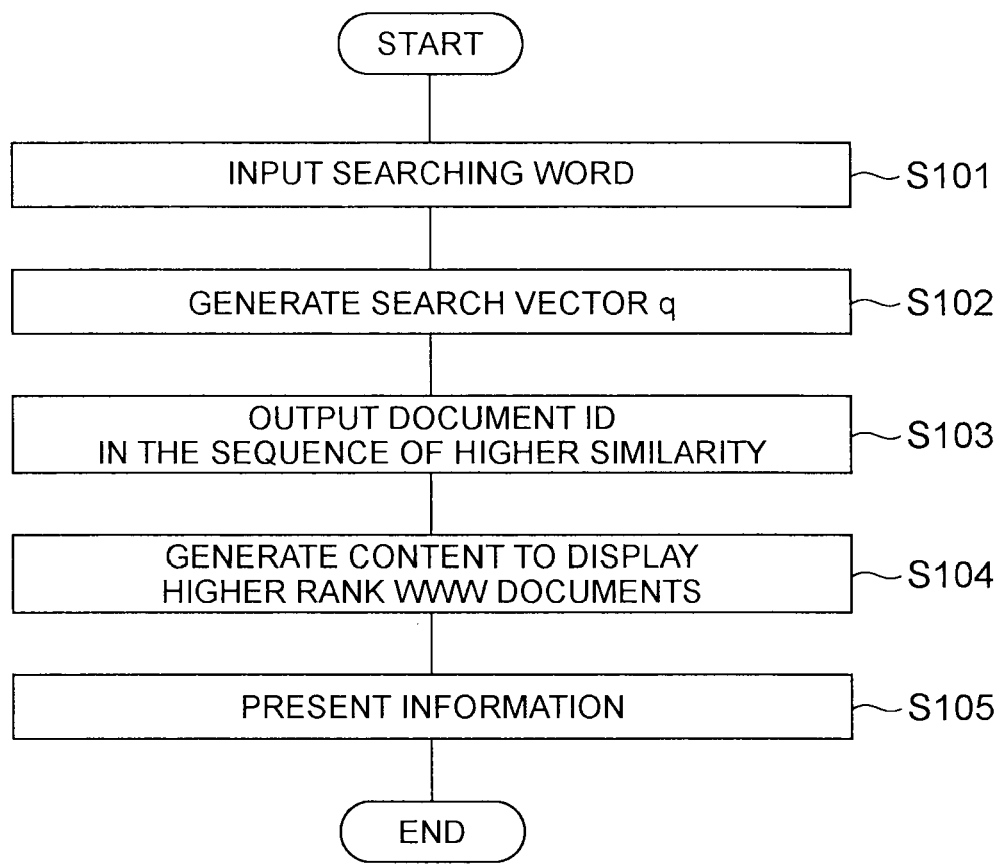
FIG. 5 is a flow chart depicting an operation of a search system.
Figure 6:
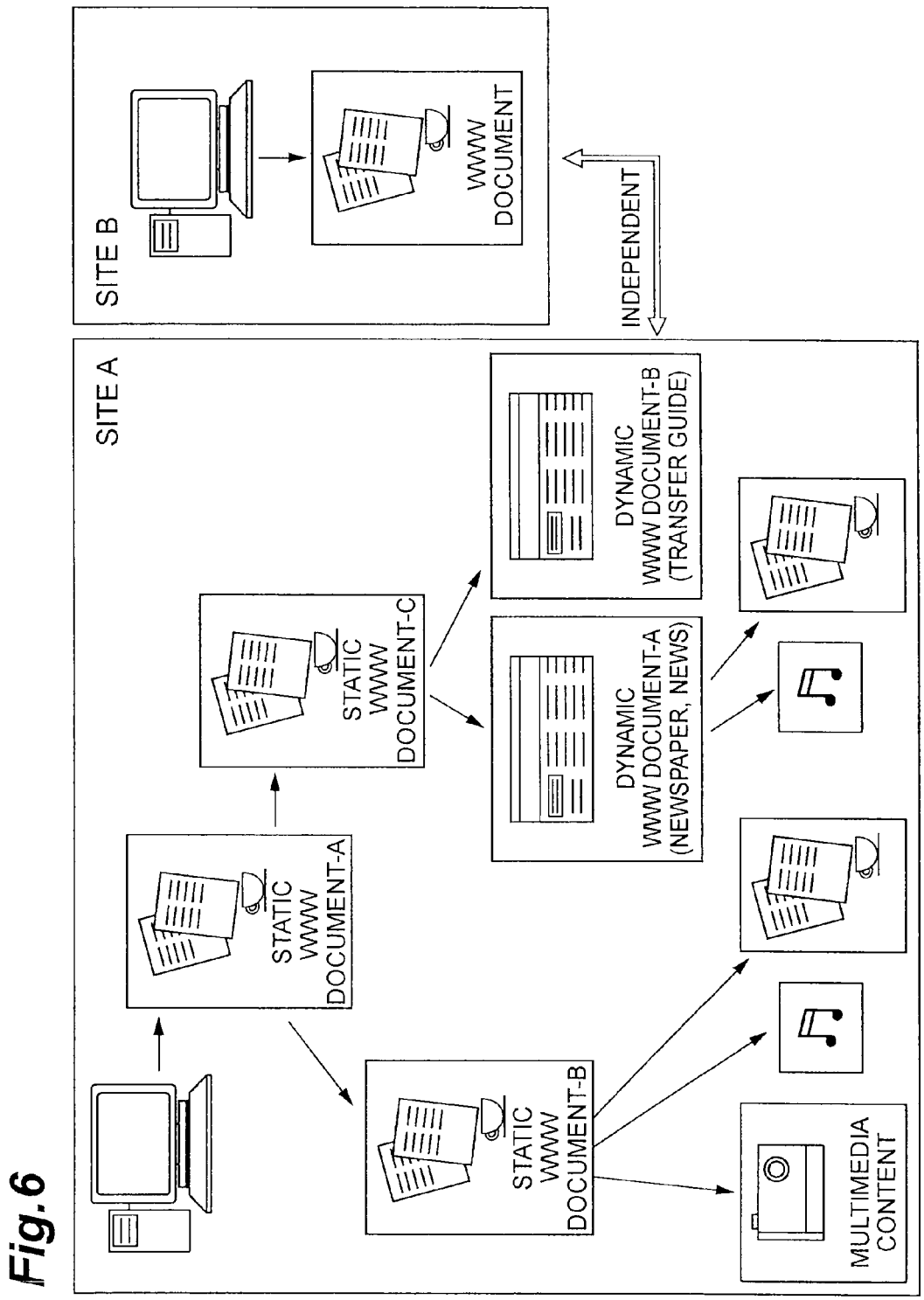
FIG. 6 is a diagram depicting a structure of mobile content in site A and site B.

The case when WWW document-A is a parent directory of WWW document-B and WWW document-C, which have mobile content structures shown in FIG. 6, is now considered. In this case, it is expected that the keywords of WWW document-B and WWW document-C are transferred to WWW document-A, which is a parent directory. [The proxy device 100] also has a similar effect on WWW documents having multimedia content.

Expression (16) and Expression (19) represent smoothing for WWW documents of which access patterns are similar, according to the distance of the user. Thereby the user profile of a user, who does not access very much, can be compensated for by peripheral users, and the WWW document vector of which document volume is small can be compensated for by user access.

Figure 19:
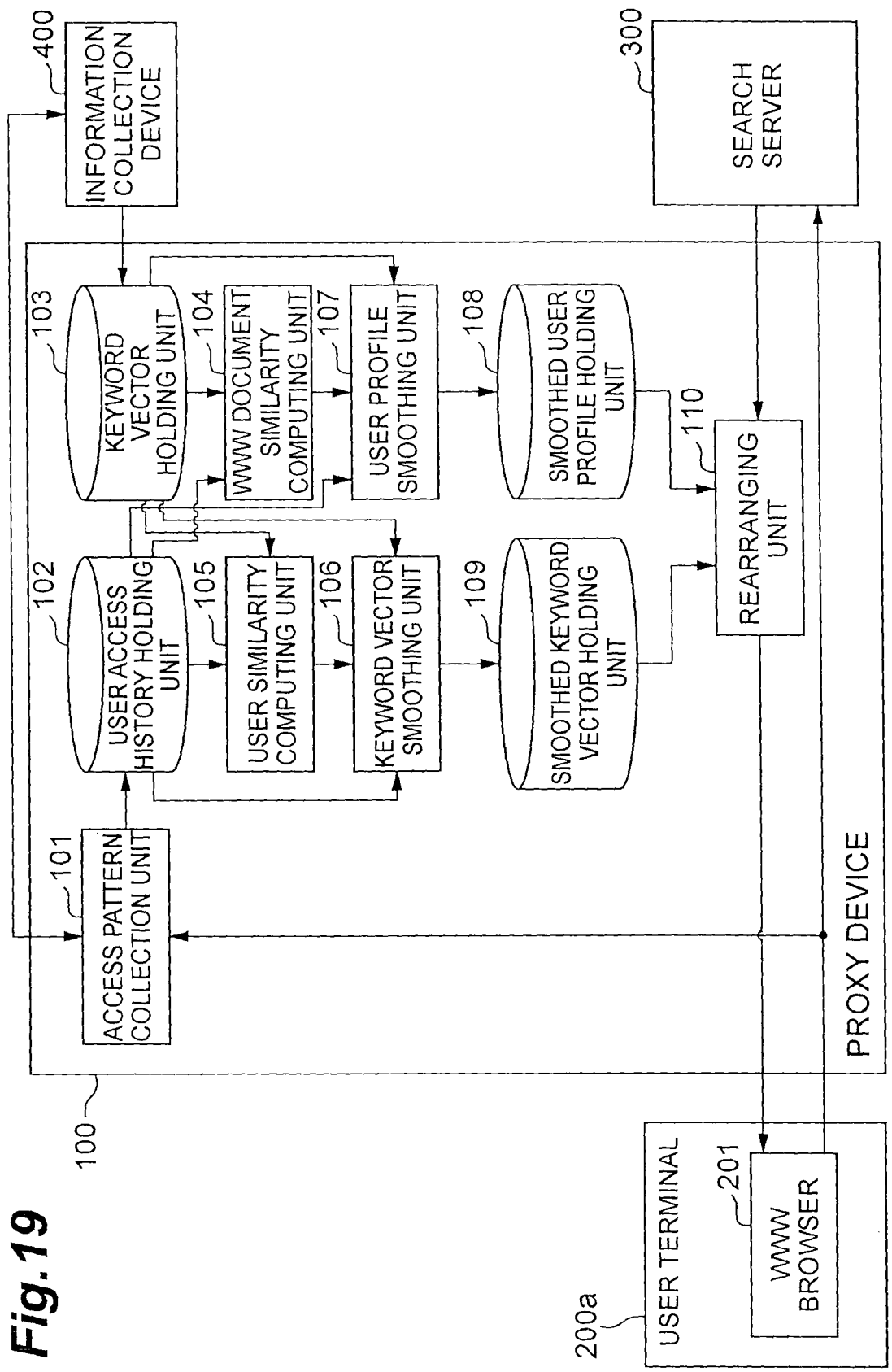
FIG. 19 is a block diagram depicting a configuration of the proxy device 100 according to a variant form of the first embodiment.

Now a variant form of a proxy device 100 will be described. FIG. 19 is a block diagram depicting a variant form of the proxy device 100. As FIG. 19 shows, in the proxy device 100, the access pattern collection unit 101 may collect access history from signals for searching, which are output from the user terminal 200a, and the collected access history may be stored in the user access history holding device 102. In this variant form, the user terminal 200a need not always have a function to collect access history and a function to send access history to the proxy device 100. In the later mentioned second embodiment and third embodiment as well, the access history may be collected by the proxy device 100 by collecting the access requests from the user terminal 200a.

The functional effect of the proxy device 100 of the present embodiment will now be described. The proxy device 100 has the user access history holding unit 102 to store the access history of one user acquired by the access pattern collection unit 101. The access pattern collection unit 101 also generates an access user vector $u_j$ which is one user pattern indicating a plurality of users who accessed one WWW document $D_j$, and an access user vector $u_{je}$ which is another user pattern indicating a plurality of users who accessed another document $D_{je}$.

The user similarity computing unit 105 computes a document similarity sim $(u_j, u_{je})$ which indicates a similarity of the WWW document $D_j$ and WWW document $D_{je}$. The keyword vector smoothing unit 106 corrects the keyword weight vector $w_{je}$ in other documents using the computed document similarity sim $(u_j, u_{je})$, and corrects the keyword weight vector $w_j$ in one document based on the corrected keyword weight vector $w_{je}$, so as to acquire the smoothed keyword weight vector $w'_j$. The smoothed keyword vector holding unit 109 stores the smoothed keyword weight vector $w'_j$ acquired here. The rearranging unit 110 can calculate the evaluation value B_SCORE for the input information for searching based on the smoothed keyword weight vector $w'_j$.

By this, the keyword weight vector can be interpolated based on a document of which user pattern of accessing users is similar, and the accuracy of a keyword weight vector of a document with small document volume, such as mobile content, can be increased, and as a result an accurate search can be implemented.

In the proxy device 100, the access pattern collection unit 101 generates a visit WWW document vector $v_k$ which is one document pattern indicating a plurality of documents accessed by one user, and a visit WWW document vector $v_{ke}$ which is another document pattern indicating a plurality of documents accessed by another user, and has the user access history holding unit 102 to store these vectors. The WWW document similarity computing unit 104 computes a user similarity sim $(v_k, v_{ke})$, which indicates a similarity between users. Using the computed user similarity sim $(v_k, v_{ke})$, the user profile smoothing unit 107 corrects a user profile $p_{ke}$, which is a document pattern of another user, and acquires the smoothed user profile $p_k$ by correcting the user profile $p_k$ of one user, based on the corrected user profile $p_{ke}$. The rearranging unit 110 can calculate the evaluation value for the input information for searching, based on the smoothed user profile $p_k$ of one user. By this, the user profile of a user who does not access much can be compensated for by a peripheral user, and a search result having high conformity for the user can be provided.

In the present embodiment, the keyword weight vector $w_j$ and user profile $p_k$ are smoothed, but it is sufficient that at least the keyword weight vector $w_j$ is smoothed. In this case, the user profile $p_k$ before smoothing is input for the smoothed user profile $p_k$ to be input to the evaluation value B_SCORE.

In the proxy device 100 of the present embodiment, the access pattern collection unit 101 acquires the significance $s_i$ to indicate significance attached to each WWW document from the information collection device 400, along with the WWW document, and the rearranging unit 110 calculates the evaluation value B_SCORE for the input information for searching, using this significance $s_i$. Since the significance can be reflected in the evaluation value, a more appropriate evaluation result can be provided.

In the proxy device 100, when the search result is output according to the search request from the user terminal 200, the rearranging unit 110 can output the search result in the sequence based on the evaluation value B_SCORE calculated as above, and can provide a search result that can be easily seen by the user, such as outputting the result in the sequence of a document having a higher evaluation value.

Also in the proxy device 100, if the smoothed keyword weight vector $w'_j$ of the one WWW document exists, the rearranging unit 110 calculates the evaluation value B_SCORE using this smoothed keyword weight vector $w'_j$ (Expression 24), and if the smoothed keyword weight vector $w'_j$ of the one WWW document does not exist, the evaluation value B_SCORE is calculated using the keyword weight vector $w'_j$ before smoothing (Expression 11). By this, the evaluation processing can be executed even if the WWW document has not been stored in advance.

Also in the proxy device 100, the access pattern collection unit 101 acquires documents from the search server according to the access from the user, and the access received here is stored in the user access history holding unit 102 as access history. By this, the function to have the user terminal 200 to hold the access history is unnecessary, and the configuration of [the proxy device 100] can be simplified.

Second Embodiment

A device to correct the evaluation value based on the significance according to the time-based change of the similarity of the access pattern of a user will be described.

Figure 12:
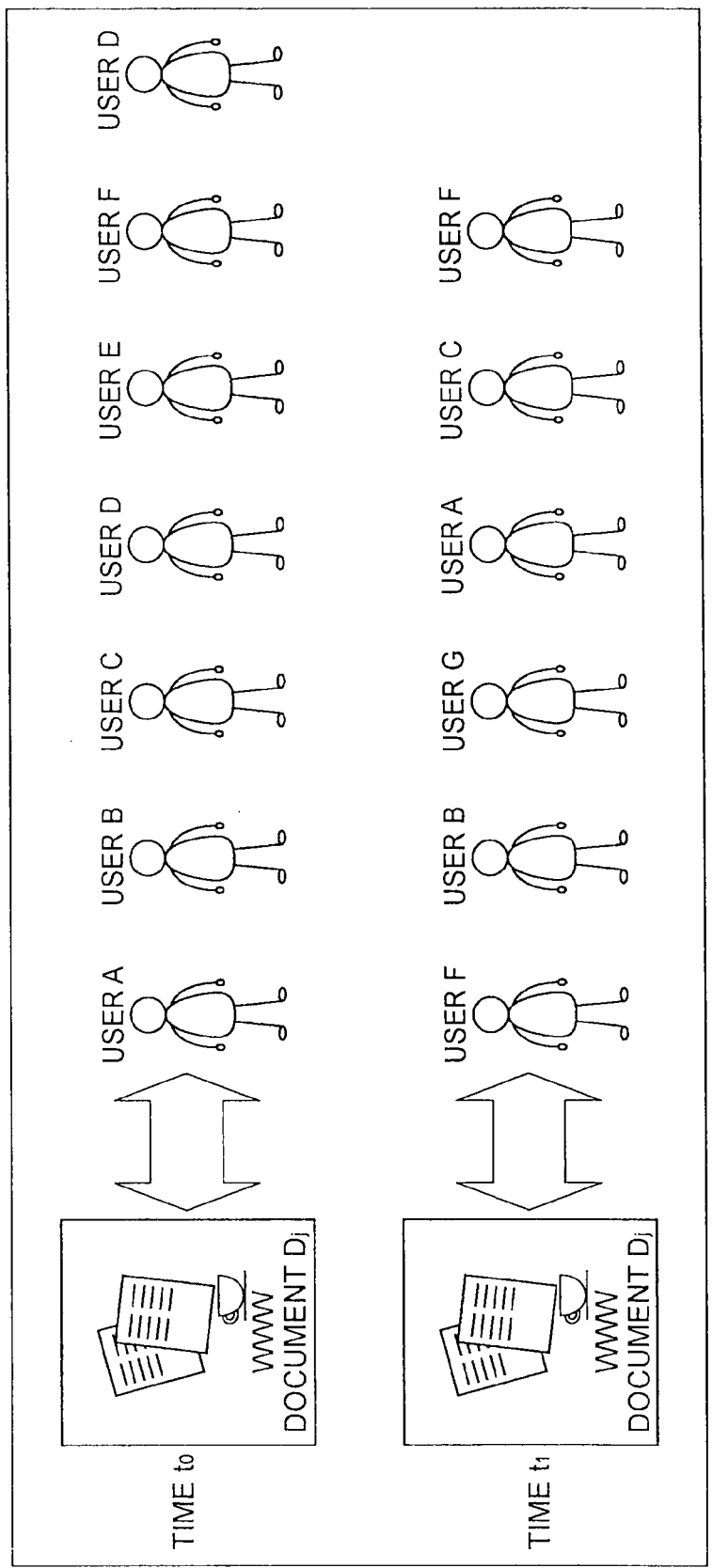
FIG. 12 is a diagram depicting users who accessed a WWW document depending on a time period.

FIG. 12 is a diagram depicting users who accessed a WWW document in each time period. Generally users who access a document change as time passes. In FIG. 12, for example, at time t0, a WWW document Dj was accessed by user A, user B, user C, user D, user E, and user F, and at time t1, this document was accessed by user A, user B, user C, user F and G. Generally the higher the degree of matching of the users who accessed a document at each time period of t0 and time t1, the higher the significance of the WWW document. In the present embodiment, the significance of a WWW document is changed according to the change status of users who access the document as time passes.

Figure 13:
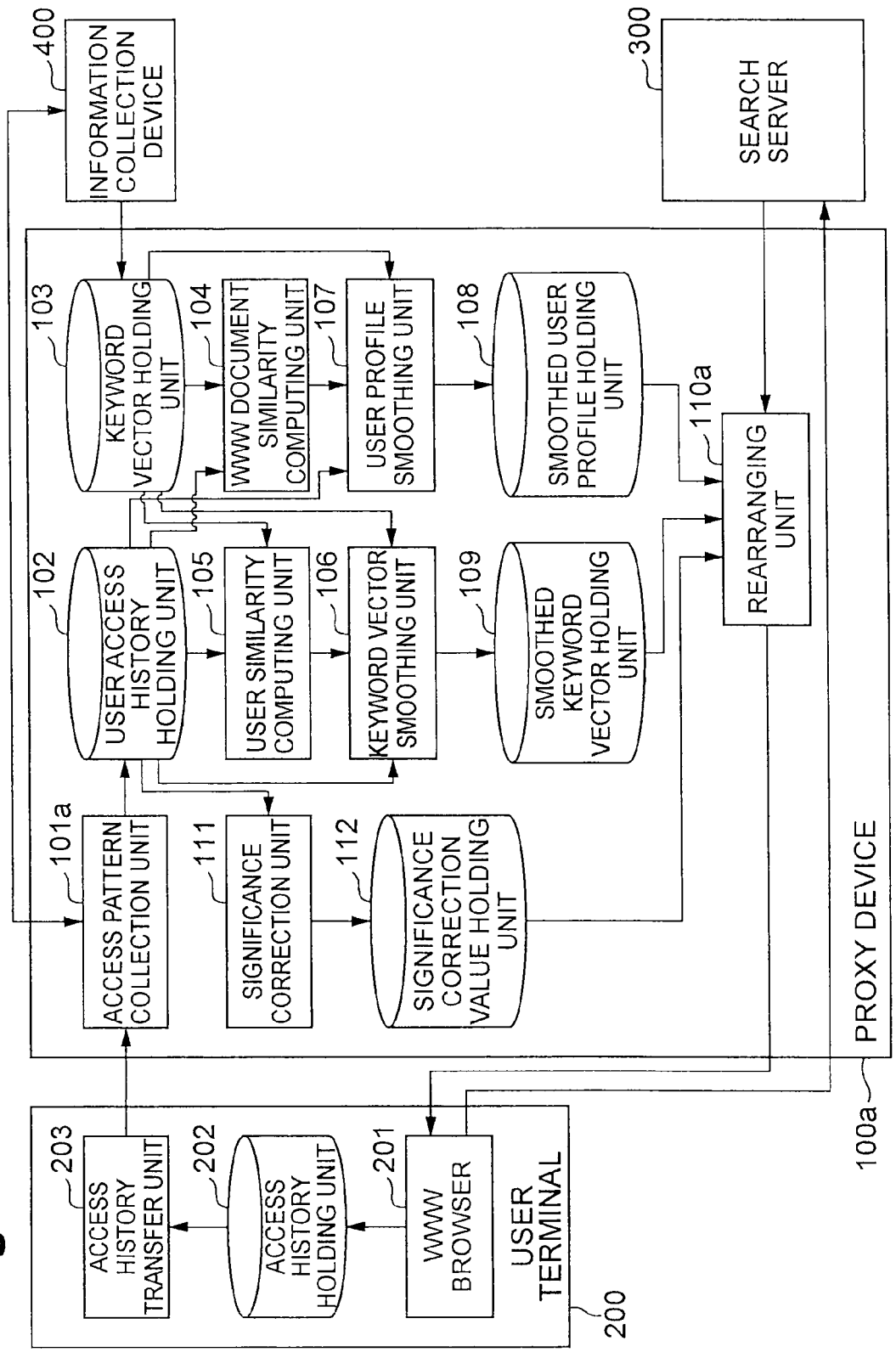
FIG. 13 is a system configuration diagram depicting a functional configuration of an information processing system using a proxy device 100a according to a second embodiment.

The configuration of the second embodiment will now be described. FIG. 13 is a system configuration diagram depicting a functional configuration of a proxy device 100a according to the second embodiment. In the proxy device 100a in the second embodiment, a WWW document that a user visits repeatedly is regarded as significant content, and the significance $s_j$ attached to the WWW document is corrected. The present embodiment is described as an extension of the first embodiment, and description on the redundant portions is omitted. In addition to the configuration of the proxy device 100 shown in the first embodiment, a significance correction unit 111 and significance correction value holding unit 112 are newly included.

The access pattern collection unit 101a is an expanded version of the access pattern collection unit 101 of the first embodiment, and in accordance with the access pattern acquired from the user terminal 200, the access user vector $u_j$ used for Expression (12) is generated respectively for each time period in the past, such as "from t to t+δ", and "from t+δ to t+2δ" as shown in Expression (24), and has the user access history holding unit 102 to store this information.

[Expression 22]

$$u_j^{(t,t+\delta)} u_j^{(t+\delta,t+2\delta)} \quad (22)$$

The significance correction unit 111 can calculate the correction value $\Delta s_j$ of the significance $s_j$ of the WWW document $D_j$, considering the similarity of access patterns (user patterns) and the number of accessed users between the time in the past, "t, t+δ" and "t+δ, t+2δ" using the access user vector $u_j$ (t, t+δ) and $u_j$ (t+δ, t+δ).

[Expression 23]

$$\Delta s_j = \log(|u_j^{(t,t+\delta)}||u_j^{(t+\delta,t+2\delta)}|)\text{sim}(u_j^{(t,t+\delta)}, u_j^{(t+\delta,t+2\delta)}) \quad (23)$$

The significance correction value holding unit 112 is a portion to store the correction value $\Delta s_j$ calculated by the significance correction unit 111.

By $\Delta s_j$, significance of the WWW document, of which access pattern did not change in the time period in the past, is corrected as Expression (24).

The rearranging unit 110a is a portion to perform processing to rearrange the top 20 WWW documents which were searched by the search server 300 using the search vector q based on the searching word which was input in the user terminal 200, and were output as the WWW document search candidates, and controls so that [the WWW documents] are displayed in the sequence of higher evaluation value, which was calculated by Expression (24).

[Expression 24]

$$B\_\text{score}(q, w'_j; p'_k, s_j + \Delta s_j) = \lambda A\_\text{score}(q, w'_j; p'_k) + (1-\lambda)(s_j + \Delta s_j), \quad 0 \leq \lambda \leq 1 \quad (24)$$

Figure 14:
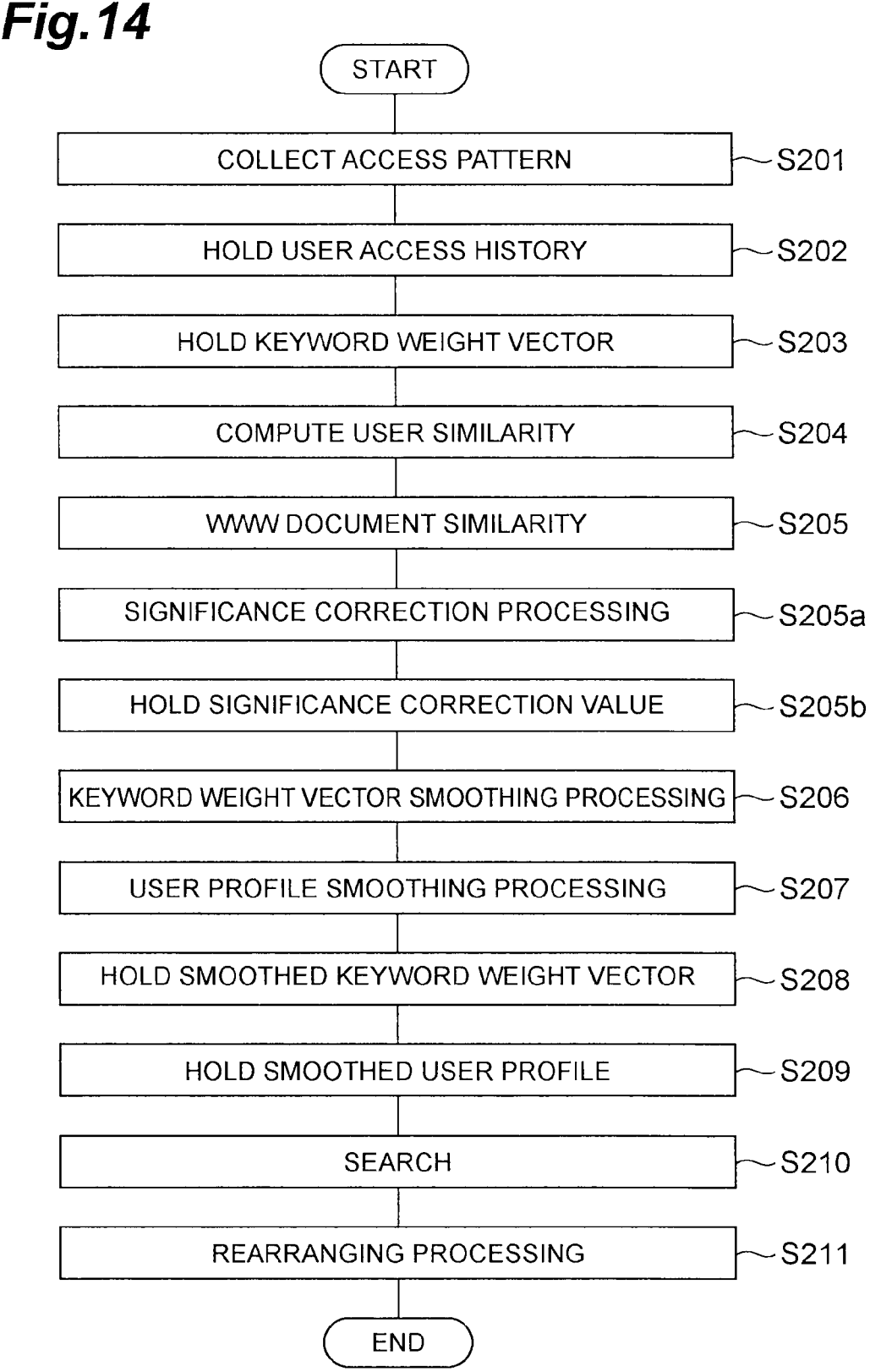
FIG. 14 is a flow chart depicting an operation of the proxy device 100a according to the present embodiment.

Operation of the proxy device 100a of the present embodiment will now be described. FIG. 14 is a flow chart depicting the operation of the proxy device 100a of the present embodiment. As FIG. 13 shows, the access pattern collection unit 101a collects access patterns of the access destination information, which each user terminal 200 accessed in a predetermined period, separately for each predetermined time period (S201). Then access destination information collected by the access pattern collection unit 101a, access user vector $u_j$ and visit WWW document vector $v_k$ generated by the access pattern collection unit 101a, and WWW documents (with significance $s_j$) acquired by the information collection device 400, are stored in the user access history holding unit 102 (S202). In the keyword vector holding unit 103, a keyword weight vector $w_j$, generated in the information collection device 400, is stored (S203). The sequence of S202 and S203 may be reversed.

Then the user similarity computation is performed by the user similarity computing unit 105 (S204). Also the WWW document similarity computation is performed (S205). Meanwhile, the correction value $\Delta s_j$ of the significance $s_j$ is generated by the significance correction unit 111 (S205a), and is stored in the significance correction value holding unit 112 (S205b).

The computed user similarity and WWW document similarity are smoothed and interpolated by the keyword vector smoothing unit 106 and user profile smoothing unit 107, and the smoothed keyword weight vector and smoothed user profile are generated (S206, S207). The generated smoothed keyword weight vector and smoothed user profile are stored in the smoothed keyword vector holding unit 109 and smoothed user profile holding unit 108 respectively (S208, S209).

When a search request is received from the user terminal 200, the search is requested to the search server 300 according to the request (S210), and when a search result is received from the search server 300, the rearranging unit 110 rearranges the search result according to the smoothed keyword weight vector, smoothed user profile and the significance $s_j$ corrected by the correction value $\Delta s_j$ (S211).

By calculating an evaluation value to which the correction value $\Delta s_j$ of significance is added so that WWW documents which are accessed repeatedly in the past to now are displayed by high ranking, a search with more conformity and output thereof can be implemented.

Now the functional effect of the proxy device 100a of the present embodiment will be described. In the proxy device 100a, the user access history holding unit 102 separately stores an access user vector $u_j$ (t, t+δ), which is a first user pattern indicating users who accessed one document in a first time period (e.g. from t to t+δ), and an access user vector $u_j$ (t+δ, t+2δ), which is a second user pattern indicating users who accessed the one document in a second time period (e.g. from t+δ, to t+2δ). Here the significance of the one WWW document can be corrected based on the similarity of the stored access user vector $u_j$ (t, t+δ), and access user vector $u_j$ (t+δ, t+2δ), and the number of accesses of the one WWW document. By this, significance of the one WWW document can be more appropriate. In other words, users who access a WWW document change as time passes, but a WWW document of which user pattern is similar and which was accessed repeatedly by the same users can be said to have high significance. Therefore the significance is corrected so that the evaluation value of this WWW document becomes high.

Third Embodiment

Figure 15:
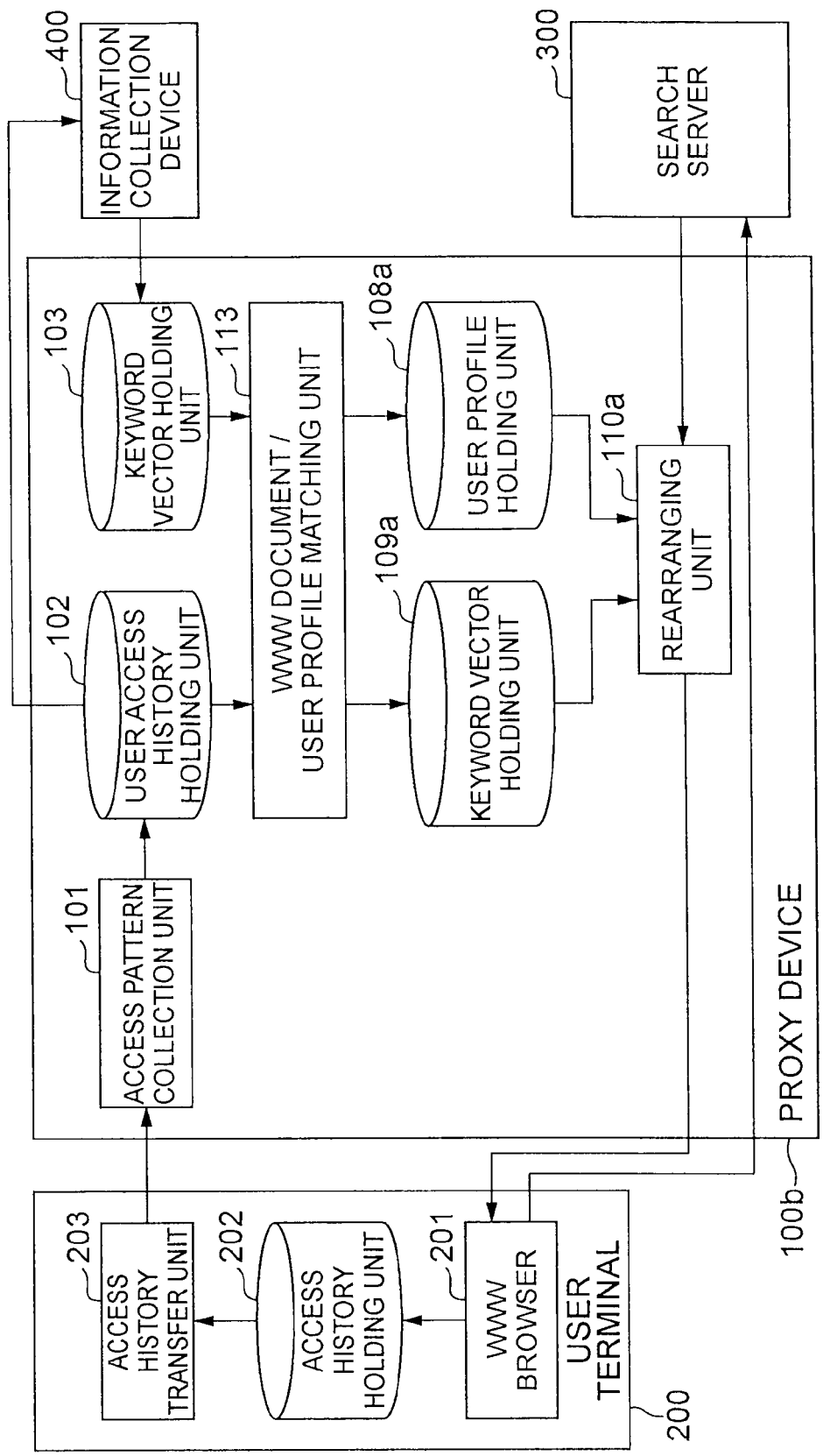
FIG. 15 is a system configuration diagram depicting a functional configuration of an information processing system using a proxy device 100b according to a third embodiment.

A proxy device 100b of the third embodiment will now be described. FIG. 15 is a system diagram depicting a functional configuration of an information processing system using the proxy device 100b of the third embodiment. The proxy device 100b has a WWW document/user profile matching unit 113, instead of the user similarity computing unit 105, WWW document similarity computing unit 104, user profile smoothing unit 107 and keyword vector smoothing unit 106 of the proxy device 100. In the first embodiment, a processing equivalent to the statistical back off smoothing is performed on the WWW document using the similarity of user access patterns, but in the present embodiment, smoothing is performed by superimposing the user profile on the keyword weight vector of the accessed WWW document, where the basic concepts are different.

Figure 16:
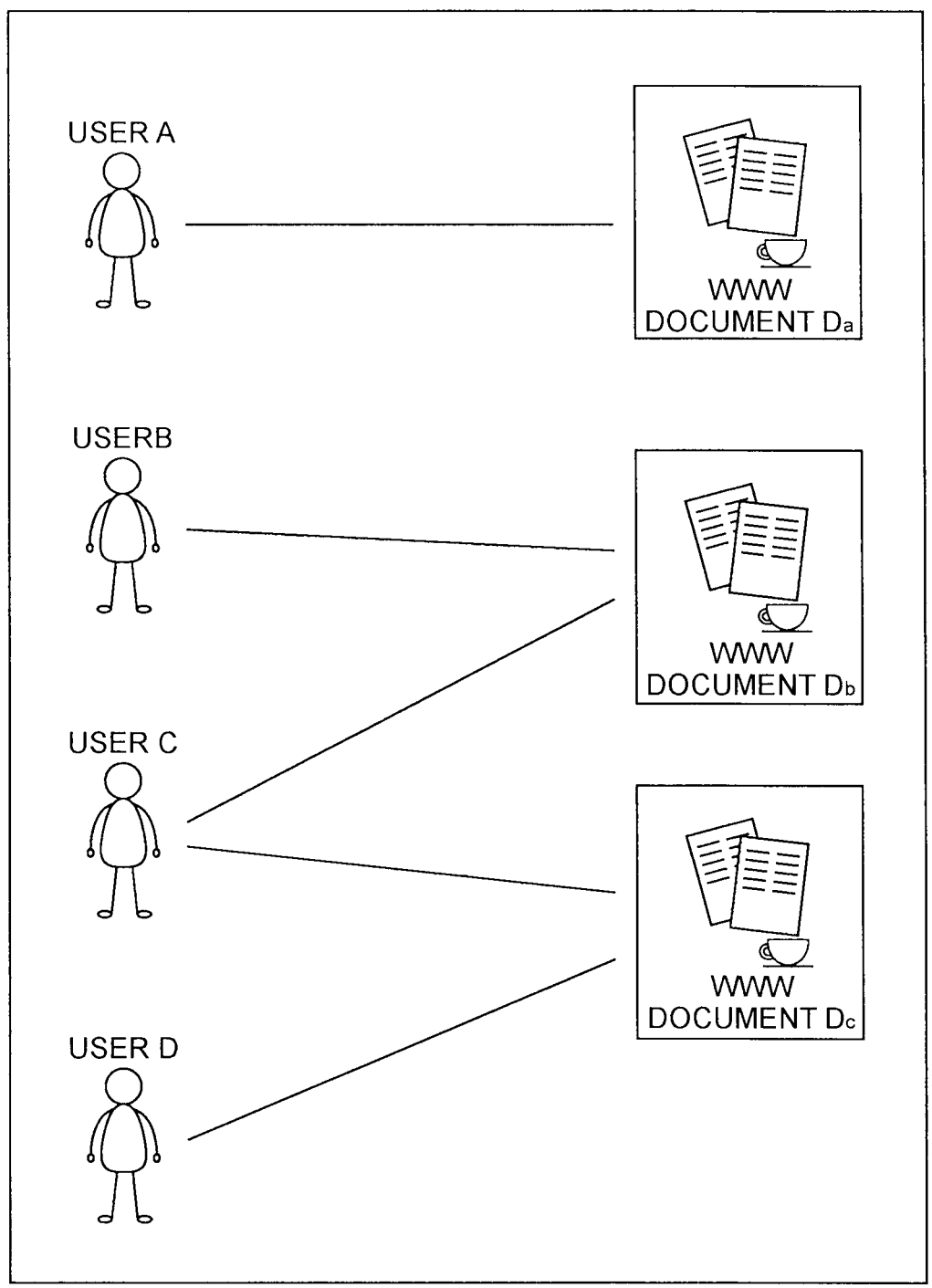
FIG. 16 is a diagram depicting an accessing relationship of users and WWW documents.

FIG. 16 is a diagram depicting the access relationships of user and WWW documents. FIG. 16 shows that the WWW document $D_a$, for example, was accessed by user A. The WWW document $D_b$ was accessed by user B and user C. The WWW document $D_c$, was accessed by user C and user D. As the relationships in FIG. 16 show, the user profile $p_k$ and the keyword weight vector $w_j$ are interdependent (linked). An object of the present embodiment is to perform smoothing and interpolation using linking, and the propagation of the user profile to the keyword weight vector via this linking.

It is assumed that the following expression is established. Expression (25) is an expression to estimate the user profile estimate value $p^-_k$ of each user from the keyword weight vector estimation value $w^-j$. Expression (25) is M rows 1 column vector=M rows N columns matrix×N row 1 column vector, and in Expression (26) is an M rows N column matrix vector. $w^-$ is the same as "ˆ" (hat) above w, and in this description, "w⁻" is used for convenience. "⁻" attached to other characters is also the same as "^" (hat) over a character.
[Expression 25]

$$\hat{p}_k = \hat{W} v_k \quad (25)$$

[Expression 26]

$$\hat{W} = [\hat{w}_1 \, \hat{w}_2 \ldots \hat{w}_N] \quad (26)$$

As Expression (27) shows, it is assumed that the keyword weight vector estimate value $w^-_j$ is a weighted mean of the user profile estimate value $p^-_k$ and keyword weight vector $w_j$. Expression (27) is M rows 1 column vector=M rows K column matrix×K rows 1 column vector, and Expression (28) is an M rows K column matrix vector.
[Expression 27]

$$\hat{w}_j = (1-\alpha)\hat{P} u_j + \alpha w_j, \, 0 < \alpha \leq 1 \quad (27)$$

[Expression 28]

$$\hat{P} = [\hat{p}_1 \, \hat{p}_2 \ldots \hat{p}_K] \quad (28)$$

Expression (27) indicates a projection from the user profile $p^-_k$ to the keyword weight vector $w^-_j$ of the WWW document, whereby the smoothing effect is implemented. The gain of this projection is $1-\alpha$, so by repeating the processing of Expression (27), the user profile $p^-_k$ and the keyword weight vector $w^-_j$ converge. To judge convergence, the inner product sim $(w_j^{-n}, w_j^{-n-1})$ of the new calculation result $w_j^{-n}$ and the previous calculation result $w_j^{-n-1}$ becomes 0.9 or more, for example. [The processing of Expression (27)] may be repeated until both of the user profile $p^-_k$ and keyword weight vector $w^-_j$ converge, or until only one converges.

The proxy device 100b will be described referring back to FIG. 15. The WWW document/user profile matching unit 113 inputs the user profile $p_k$, which was generated based on the keyword weight vector $w_j$ stored in the keyword vector holding unit 103 and the visit document vector $v_k$ stored in the user access history holding unit 102, and generates the user profile $p_k$ and keyword weight vector estimate value $w_j$ repeatedly using Expression (25) and Expression (27), until the keyword weight vector estimate value $w_j$ converges.

In more concrete terms, the WWW document/user profile matching unit 113 generates a user profile estimate value $p^-_k$ as an initial value in Expression (25). W⁻ at this time is a keyword weight vector $w_j$ of the initial value. And [the WWW document/user profile matching unit 113] generates the keyword weight vector estimate value $w^-_j$ using the initial value $p^-_k$ in Expression (27). Using this keyword weight vector estimate value $w^-_j$ again in Expression (25), the user profile estimate value $p^-_k$ is generated. Here the WWW document/user profile matching unit 113 normalizes each element, and judges whether the similarity of the keyword weight vector estimate value $w_j^{-n}$ and the previous keyword weight vector estimate value $w_j^{-n-1}$ is a predetermined value or more. Similarity here is calculated by the inner product sim $(w_j^{-n}, w_j^{-n-1})$ (see Expression (7).

The keyword weight vector estimate value w % and user profile estimate value $p^-_k$ converged here are stored in the user profile holding unit 108a and keyword vector holding unit 109a as keyword weight vector $w_j$ and user profile $p_k$ respectively.

The rearranging unit 110 calculates the evaluation values using the user profile $p_k$ and keyword weight vector $w_j$ stored in the user profile holding unit 108a and keyword vector holding unit 109a, by one of Expression (8), Expression (11), Expression (21) and Expression (24).

Figure 17:
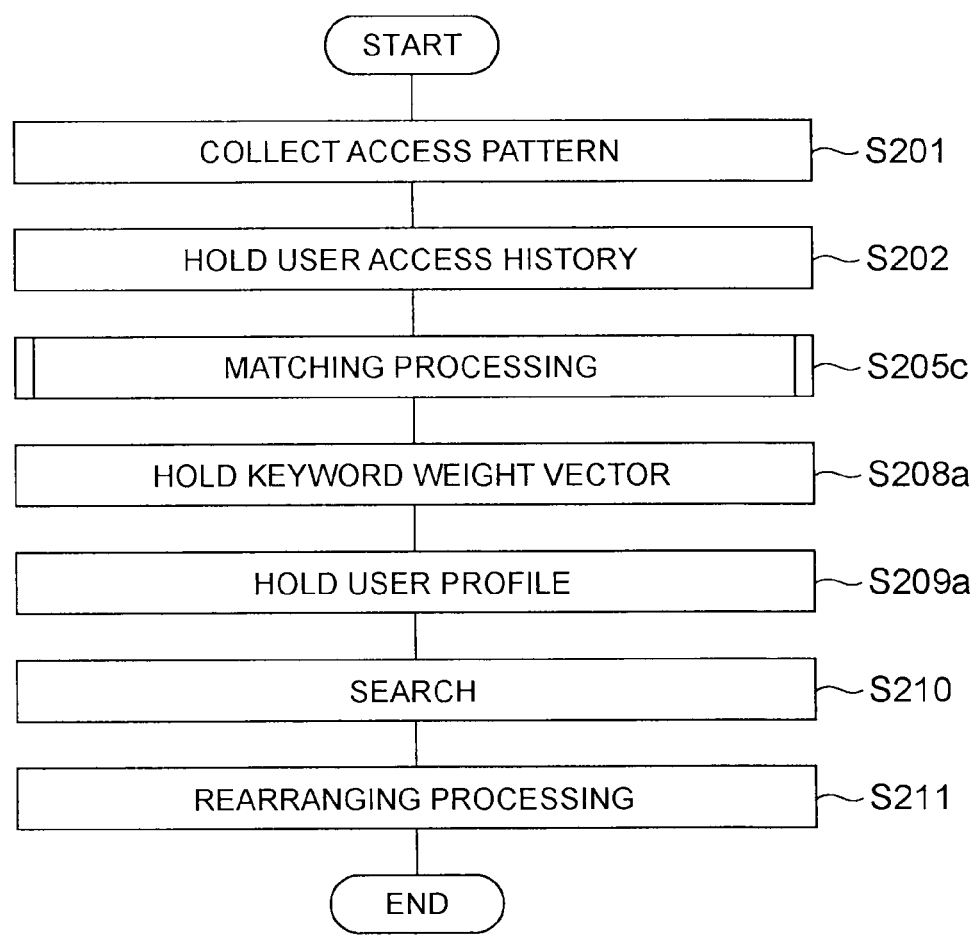
FIG. 17 is a flow chart depicting an operation of the proxy device 100b according to the present embodiment.

Now the processing of the proxy device 100b constructed like this will be described. FIG. 17 is a flow chart depicting an operation of the proxy device 100b. As FIG. 17 shows, the access pattern of the access destination information of each user terminal 200 accessed in a predetermined period is collected by the access pattern collection unit 101 (S201). Then the access destination information collected by the access pattern collection unit 101, access user vector $u_j$ and visit WWW document vector $v_k$ generated by the access pattern collection unit 101a and the WWW document acquired by the information collection device 400 are stored in the user access history holding unit 102 (S202). Here the matching processing of the keyword weight vector $w_j$ and user profile $p_k$ is performed using the stored access user vector $u_j$ and visit WWW document vector $v_k$. This matching processing will be described in detail in FIG. 18. The keyword weight vector and user profile after matching processing is performed are stored in the keyword vector holding unit 109a and user profile holding unit 108a respectively (S208a, S209a).

Then when a search request is received from the user terminal 200, the search is requested to the search server 300 according to the request (S210), and when the search result is received from the search server 300, the rearranging unit 110 rearranges the search result by the matched keyword weight vector and user profile (S211).

Figure 18:
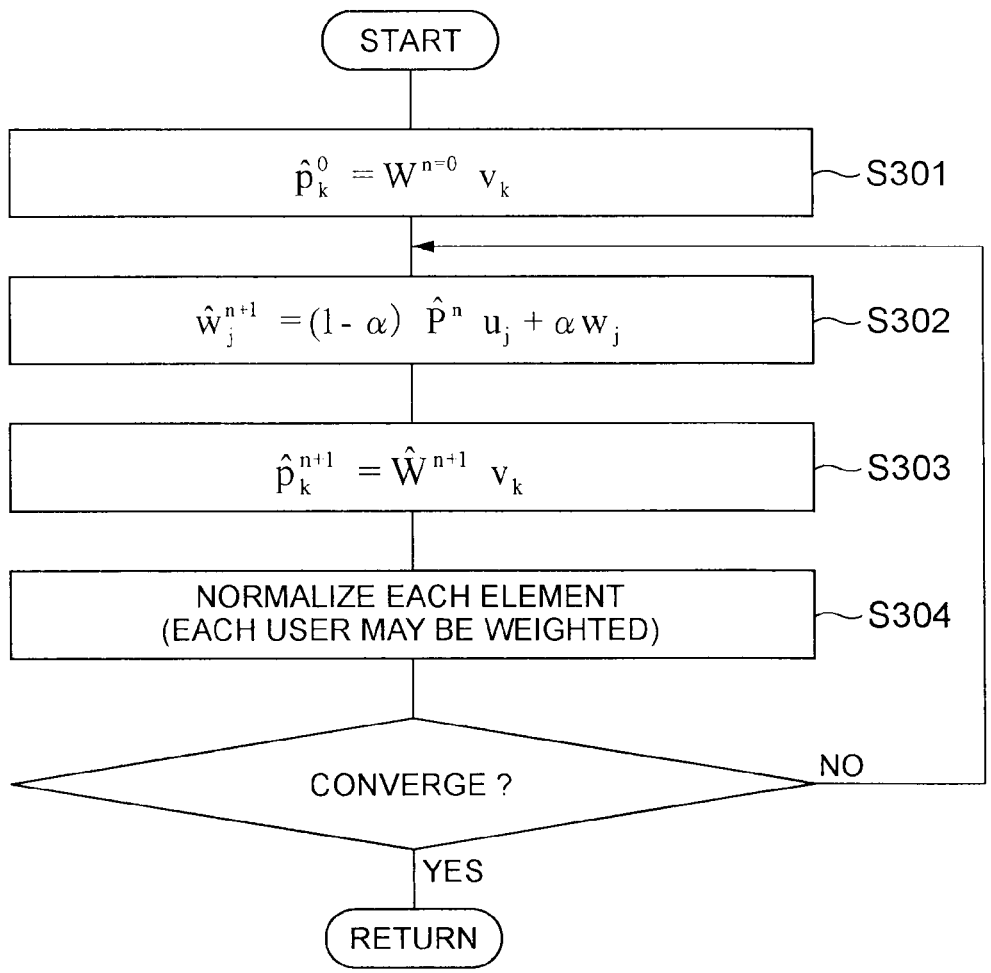
FIG. 18 is a flow chart depicting a detailed processing of a matching processing.

FIG. 18 is a flow chart depicting a detailed processing of the matching processing in S205c. First initialization processing is performed with n=0, and $p_k^{-0} = w^{-n=0} v_k$ is calculated (S301). Then $w_j^{-n+1} = (1-\alpha) \, p^{-n} u_j + \alpha w_j^n$ is calculated (S302). Then $p_k^{-n+1} = w^{-n+1} v_k$ is calculated (S303), and each element is normalized (or weighting processing of each user is performed) (S304). Then it is judged whether the user profile $p^-_k$ converged (S305). For example, the inner product of $p_k^{-n}$ and $p_k^{-n+1}$, that is (sim $(p_k^{-n}, p_k^{-n+1})$) is calculated, and if the result is less than a predetermined value, it is judged that the user profile is not converged, and [processing] returns to S302 with n=n+1, and the same processing is performed again.

The similarity is a predetermined value or more, 0.9 or more, for example, then it is judged that the user profile converged, and the keyword weight vector $w_j^{-n+1}$ and user profile estimate value $p_k^{-n+1}$ are stored in the keyword vector holding unit 109a and user profile holding unit 108a as the keyword weight vector $w_j$ and user profile $p_k$ respectively. This data is used for calculating evaluation values for rearranging processing (see Expression (8), Expression (11), Expression (21) or Expression (24)).

Now the functional effect of the proxy device 100b of the present embodiment will be described. First the WWW document/user profile matching unit 113 generates a user profile $p_k^{-n}$ based on the keyword weight vector $w^{n=0}$ to be a reference value, and generates a new keyword weight vector $w_j^{-n+1}$ based on the generated user profile $p_k^{-n}$ and a keyword weight vector $w_j$ to be a reference value. Then [the WWW document/user profile matching unit 113] generates a new user profile $p_k^{-n+1}$ based on the new keyword weight vector $w_j^{-n+1}$. And a similarity of the new user profile $p_k^{-n+1}$ and a user profile $p_k^{-n}$ generated immediately before this new user profile is computed, and it is judged whether the similarity is a predetermined value or more. Here the user profile $p_k^{-n+1}$ and keyword weight vector $w_j^{-n+1}$ are repeatedly generated until the similarity becomes a predetermined value or more, and the evaluation values are calculated based on the keyword weight vector $w_j^{-n+1}$ and user profile $p_k^{-n+1}$ when the computed similarity becomes a predetermined value or more.

By generating the keyword weight vector and user profile to be interdependent, the user profile propagates to the keyword weight vector, thereby smoothing and interpolation of the user profile and keyword weight vector can be performed.

Therefore the keyword weight vector of a document having a low document volume, such as mobile content, can be more accurate. Also the user profile of a user who does not access much can be compensated for by a peripheral user, and a search result with high conformity to the user can be provided.

<Variant Forms of First to Third Embodiments>

Now variant forms of the first embodiment to the third embodiment will be described. In each of these embodiments, the user terminal 200 has the access history holding unit 202, but the proxy device 100, 100a or 100b may have [the access history holding unit 202]. In this case, the access history need not be transferred from the user terminal 200, so the access history transfer unit 203 is unnecessary.

The first embodiment to third embodiment were described in the form of the device and method, but may be implemented in the form of a program. In other words, [the present invention] can be embodied as a document processing program by constructing each configuration using program modules. In concrete terms, a configuration the same as those in each block diagram of the first to third embodiments, is modulized, and this program is stored in a storage media (e.g. CDROM), and is read by a personal computer.

Fourth Embodiment

Now a method for calculating significance of a WWW document using HITS will be described. As mentioned in the section on related art, authority is a page having high significance, among the pages related to a keyword. It is desirable that a page to be an authority is displayed with a high ranking in the search result. A hub, on the other hand, is hidden data for discovering authority. The HITS calculation step will now be described in concrete terms.

Figure 20:
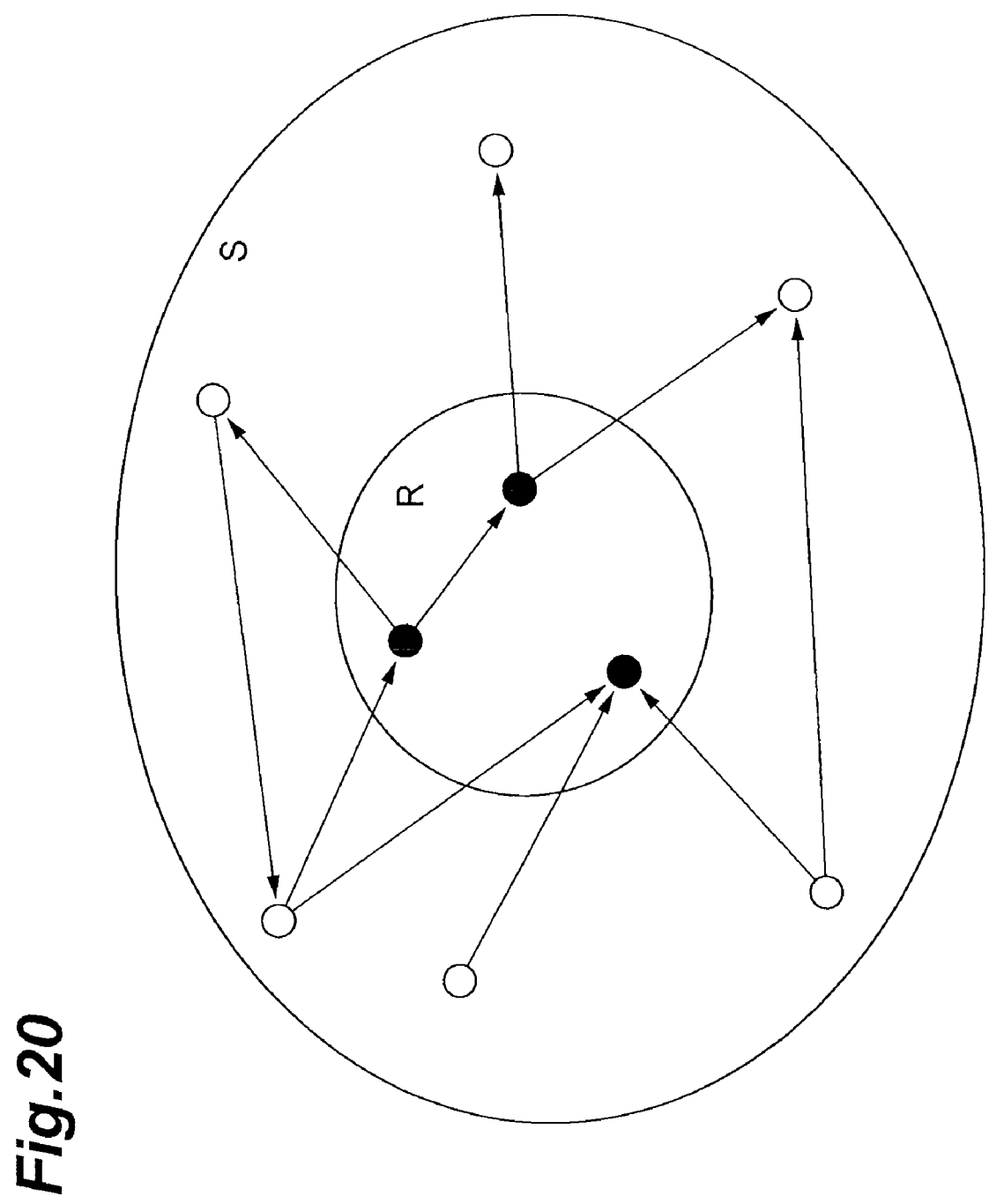
FIG. 20 is a conceptual diagram depicting a concept of a search space expansion.

WWW documents to be the search target are extracted by keyword matching or the like. The top 200 documents, for example, are extracted in general, and are called "WWW document set R". A WWW document to be an authority is ideally included in this group, but may not be, so WWW documents which are linked from the WWW documents belonging to the WWW document set R and WWW documents which link to the WWW documents belonging to the WWW document set R are extracted, and these documents become search target S. FIG. 20 shows the concept of the search space expansion by linking.

As the following Expression (29) shows, an authority score $a_i$ and hub score $h_i$ are assigned to a WWW document belonging to search target S.

[Expression 29]

$$a = (a_0, a_1, \ldots, a_p, \ldots a_{N-1})^T$$

$$h = (h_0, h_1, \ldots, h_p, \ldots h_{N-1})^T \quad (29)$$

The total number of WWW documents included in the search target S is N. The suffix T denotes the transposition of the matrix vector.

1. Initialization

The authority score a and hub score h are initialized as shown in the following Expression (30).

[Expression 30]

$$a_{<t=0>} = (1, 1, \ldots, 1)^T \in R^N, h_{<t=0>} = (1, 1, \ldots, 1)^T \in R^N \quad (30)$$

These are non-negative integers which indicate a number of repeats in operation after <t=0>.

2. Updating Authority Score and Hub Score

[Expression 31]

$$a_{<t>}$$

$$h_{<t>} \quad (31)$$

Expression (31) is updated by the calculation according to the link structure shown in the following Expression (32).

For each page p, the total of authority scores of pages to which the page p is linked is calculated, and the hub score hp of the page p is replaced with this total. And for each page p, the total of hub scores of pages which link to this page p is calculated, and the authority ap of the page p is replaced with this total.

[Expression 32]

For all p∈S, $h_p = \Sigma_{q:\text{link of } p \to q} a_q$

For all p∈S, $a_p = \Sigma_{q:\text{link of } q \to p} h_q \quad (32)$

3. Normalization

Normalization is performed so that the norm of column vector a of the authority score and column vector h of the hub score become 1 (see Expression (33)).

[Expression 33]

$$a_{<t>} \leftarrow a_{<t>}/\|a_{<t>}\|$$

$$h_{<t>} \leftarrow h_{<t>}/\|h_{<t>}\| \quad (33)$$

The above update processing and normalization processing are repeated until the authority score and hub score converge. Normally convergence takes about several tens of times, and here [computing is repeated until] t=100 (see Expression (34)).

[Expression 34]

$$a_{<t=100>}, h_{<t=100>} \quad (34)$$

Convergence of this computation is guaranteed as the existence of a solution of the Eigen value problem of a matrix.

First the link structure is represented by the N×N square connection matrix shown in the following Expression (35).

[Expression 35]

$$C = \begin{bmatrix} c_{00} & \cdots & c_{0,N-1} \\ \vdots & \ddots & \\ c_{N-1,0} & \cdots & c_{N-1,N-1} \end{bmatrix} \quad (35)$$

$c_{ij} = 1$: reference from $j$ to $i$

0: no reference

The above repeated calculation is as shown in the following Expression (36).

[Expression 36]

$$h_{<t+1>} \leftarrow C^T a_{<t>}$$

$$a_{<t+1>} \leftarrow C h_{<t>} \quad (36)$$

Because of the above expressions and normalization processing, the authority score and hub score can be determined as shown in the following Expression (37).

[Expression 37]

$h_{<t=\infty>} \leftarrow$ Eigen vector corresponding to the maximum Eigen value of $C^T C$ $a_{<t=\infty>} \leftarrow$ Eigen vector corresponding to the maximum Eigen value of $CC^T \quad (37)$ The authority score does not depend on the initialization, but can be uniquely determined by the link structure. Therefore a document with high significance, that is, with a high authority score in this case, can be extracted from WWW documents having high conformity.

The present embodiment uses the HITS calculation method. In concrete terms, in the HITS of prior art, the target is the link structure of the WWW documents. The present embodiment is characterized in that the conformity is calculated using the link structure involved in the access state of the user. Details will be described below.

Figure 21:
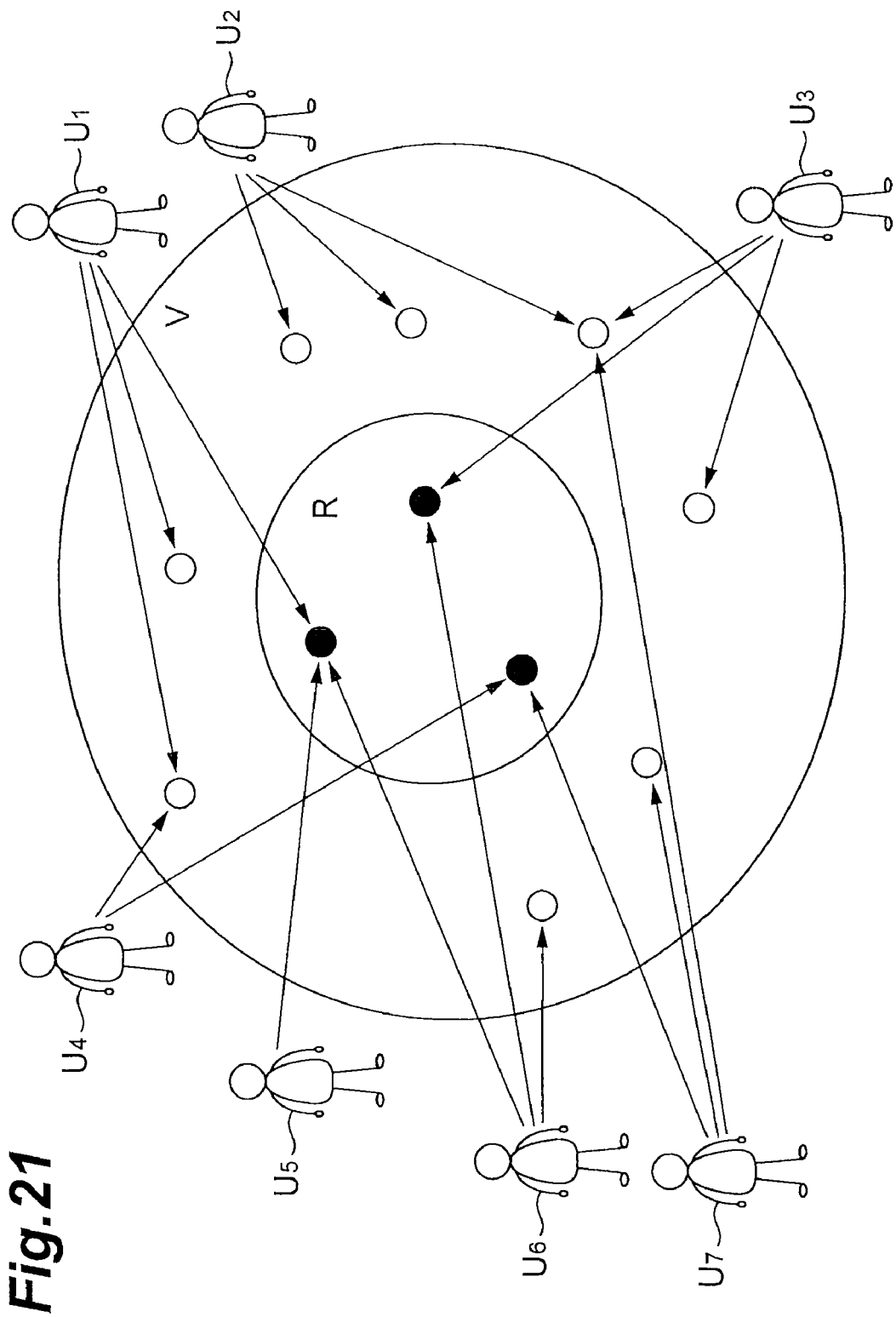
FIG. 21 is a conceptual diagram depicting a concept of an HITS algorithm intervening access status by users.

FIG. 21 is a conceptual diagram depicting a concept of the HITS algorithm including the access stats of users. As FIG. 21 shows, the WWW document set R is a WWW document set conforming to the searching word. The users $U_1$ to $U_7$ are users who accessed the WWW document set R. The WWW document set V is defined as WWW documents accessed by the users $U_1$ to $U_7$. An object of the document processing device of the present embodiment is to determine the significance of each searched WWW document by calculating the authority score of each WWW document belonging to the WWW document set V defined like this. Now configuration of the document processing device to implement this method will be described.

Figure 22:
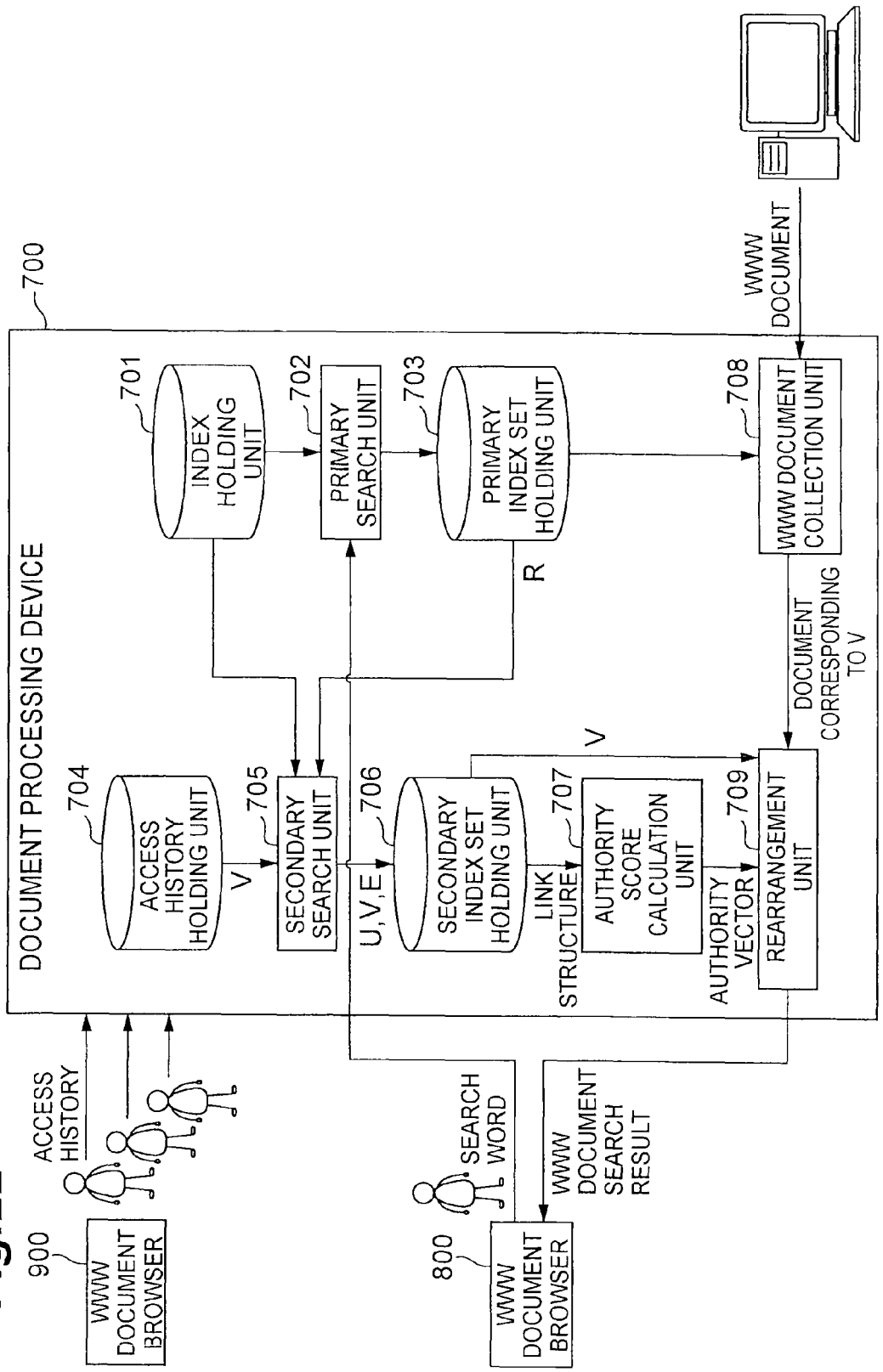
FIG. 22 is a block diagram depicting functions of a document processing device 700 according to the fourth embodiment.

FIG. 22 is a block diagram depicting the functions of the document processing device 700. The document processing device 700 includes an index holding unit 701 (data structure holding means), primary searching unit 702 (primary WWW document extraction means), primary index set holding unit 703, access history holding unit 704 (access history holding means), secondary searching unit 705 (user extraction means, secondary WWW document extraction means), secondary index set holding means 706, authority score calculation unit 707 (significance calculation means), WWW document collection unit 708, and rearranging unit 709. Each composing element will now be described. In the present embodiment, various composing elements are included in one device, but [the present invention] is not limited to this configuration, but may comprise a plurality of devices interconnected via a network. For example, the access history holding unit 704 is in the document processing device 700, but may be installed at the user terminal side, so as to acquire access history whenever necessary.

The index holding unit 701 is a portion to store the index file (such information as keyword in a document) in a WWW document. It is preferable that the index file includes not only such information as a keyword and URL, but link information (URL) to other WWW documents included in this WWW document, as information to make searching easier. If the link information is written in the index file, each WWW document can be managed by a directed graph to indicate the relationship of links among each WWW document.

The primary searching unit 702 is a portion to search a WWW document including a searching word, which was input from WWW document browser 800 of the user terminal, from the index file stored in the index holding unit 701.

The primary index set holding unit 703 is a portion to store the WWW documents searched by the primary searching unit 702, as an initial WWW document set.

The access history holding unit 704 is a portion to store the access history of a WWW document in a WWW document browser 900 (including the WWW document browser 800), and to store the ID information for specifying a user and a URL to indicate that the accessed content is corresponded and stored.

The secondary searching unit 705 is a portion to specify, from the access history holding unit 704, users who accessed each WWW document of the WWW document set stored in the primary index set holding unit 703, and to search which WWW document the specified user accessed, thereby the WWW document set is extracted.

The secondary index set holding unit 706 is a portion to store the WWW document set extracted by the secondary searching unit 705.

The authority score calculation unit 707 is a portion to calculate the authority score. In concrete terms, [the authority score calculation unit 707] is implemented by the following processing.

The authority score calculation unit 707 extracts a user set U who accessed the WWW document set R conforming to the searching word, which was input via the WWW document browser 800, from the access history holding unit 704, and determines the WWW document set V which the users (WWW document browsers), specified by this user set U, accessed.

The reference information from the user set U to the WWW document set V is represented by the following Expression (38) in list format.
[Expression 38]

$$E=\{(p \cdot q) | \text{reference from } p \in U \text{ to } q \in V\} \qquad (38)$$

The authority score a and hub score h are represented by the vectors given by the following Expression (39), where M denotes a number of users of the user set U and N denotes a number of documents of the WWW document set V.
[Expression 39]

$$a=(a_0, a_1, \ldots a_p, \ldots a_{N-1})^T$$

$$h=(h_0, h_1, \ldots h_p, \ldots h_{M-1})^T \qquad (39)$$

Figure 23:
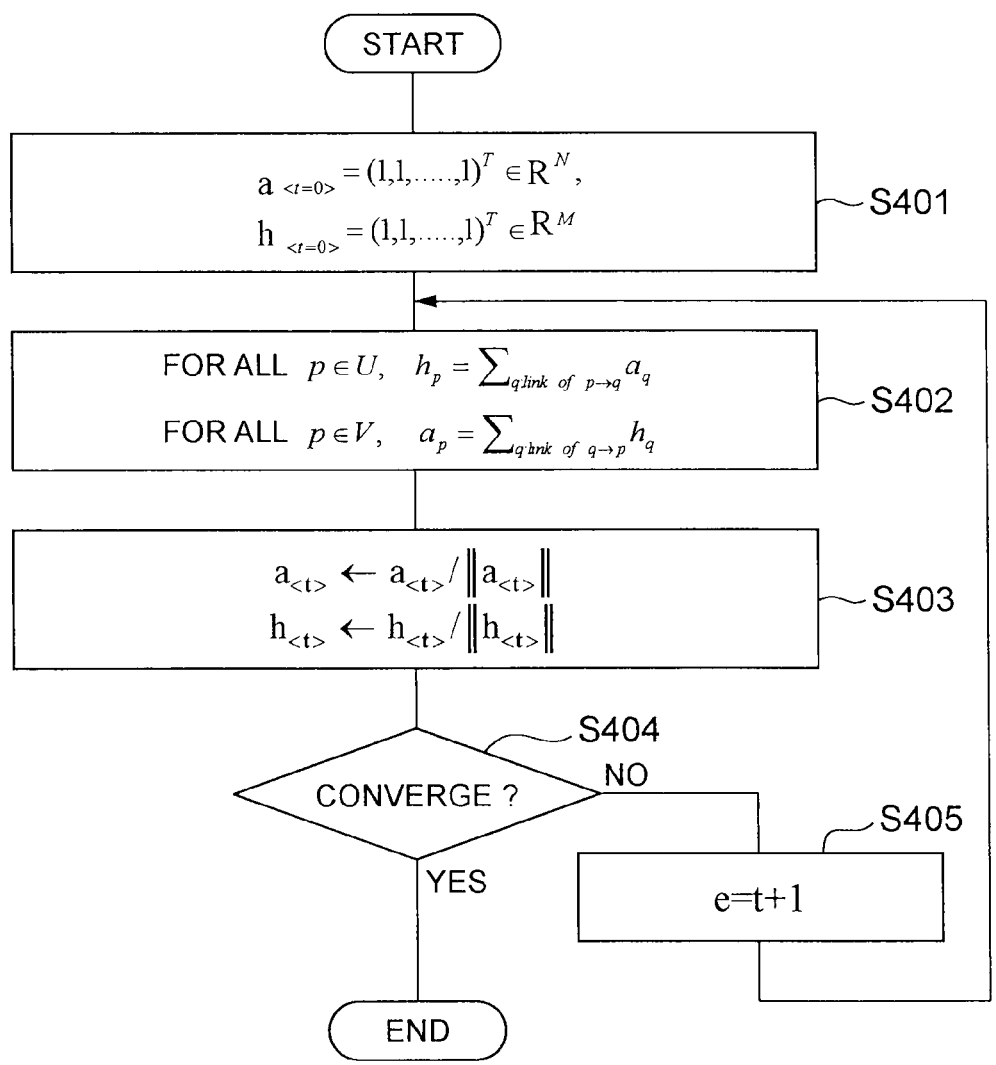
FIG. 23 is a flow chart depicting a processing of an authority score calculation unit 707.

As this vector representations show, the authority score is defined on the WWW document set V, and the hub score is defined on the user set U. Based on this, the processing shown in FIG. 23 is executed.

S401: Initialization (See Expression (40))
[Expression 40]

$$a_{<t=0>}=(1, 1, \ldots, 1)^T \in R^N,$$

$$h_{<t=0>}=(1, 1, \ldots, 1)^T \in R^M \qquad (40)$$

S402: Update
The following Expression (41) is calculated with reference to the reference information E.
[Expression 41]

$$\text{For all } p \in U, h_p = \Sigma_{q:\text{link of } p \to q} a_q$$

$$\text{For all } p \in V, a_p = \Sigma_{q:\text{link of } q \to p} h_q \qquad (41)$$

S403: Normalization (See Expression (42))
[Expression 42]

$$a_{<t>} \leftarrow a_{<t>}/\|a_{<t>}\|$$

$$h_{<t>} \leftarrow h_{<t>}/\|h_{<t>}\| \qquad (42)$$

S404: Convergence Judgment
The processings of S402 and S403 are executed until the authority score a and hub score h converge. The processing count is also judged in parallel, so that the processings in S402 and S403 do not exceed 100.

S405: t=t+1
If convergence is not reached in S404, 1 is added to t, and the processings in S402 and S403 are executed. As mentioned above, this processing is repeated until t=100. In this way, the authority score a and hub score h are calculated.

The WWW document collection unit 708 is a portion to collect WWW documents according to the index being held in the primary index set holding unit 703.

The rearranging unit 709 is a portion to rearrange the WWW documents collected by the WWW document collection unit 708 according to the WWW documents (index information) extracted by the secondary index set holding unit 706, and the authority score. By this rearrangement, the WWW documents are displayed in the sequence of the authority score in the WWW document browser 800, whereby WWW documents with more significance can be more easily accessed.

The functional effect of the present embodiment will now be described. In the document processing device 700 of the present embodiment, the primary searching unit 702 searches according to the searching word which was input via the WWW document browser 800, the secondary searching unit 705 extracts a user set U of users who accessed the searched WWW document R, and extracts the WWW document set V of the WWW document accessed by the user, and stores [the user set U and WWW document set V] in the secondary index set holding unit 706. The authority score calculation unit 707 can calculate the significance (authority score a) of each WWW document based on a degree of accesses by the user to the extracted WWW document set V (hub score h). By this, significance of a WWW document of which access quantity and link quantity are low, such as mobile content, can be accurately calculated, and an accurate search can be implemented.

<Variant Form of Fourth Embodiment>

In the fourth embodiment, the WWW document set V, which is a set of WWW documents referred to by users, is determined based on a user set U, which is a set of users who visited WWW document set R conforming to the searching word, but this WWW document set V may become too large, or a WWW document of which conformity is low but number of access users is high (e.g. a specific popular portal site) may be extracted as an authority. Therefore a possible variant form is to perform the authority calculation based on an expanded WWW document set S, where a WWW document set which is referred to by the WWW document set R and a WWW document set which refers to the WWW document set R are added, just like the prior art.

Figure 24:
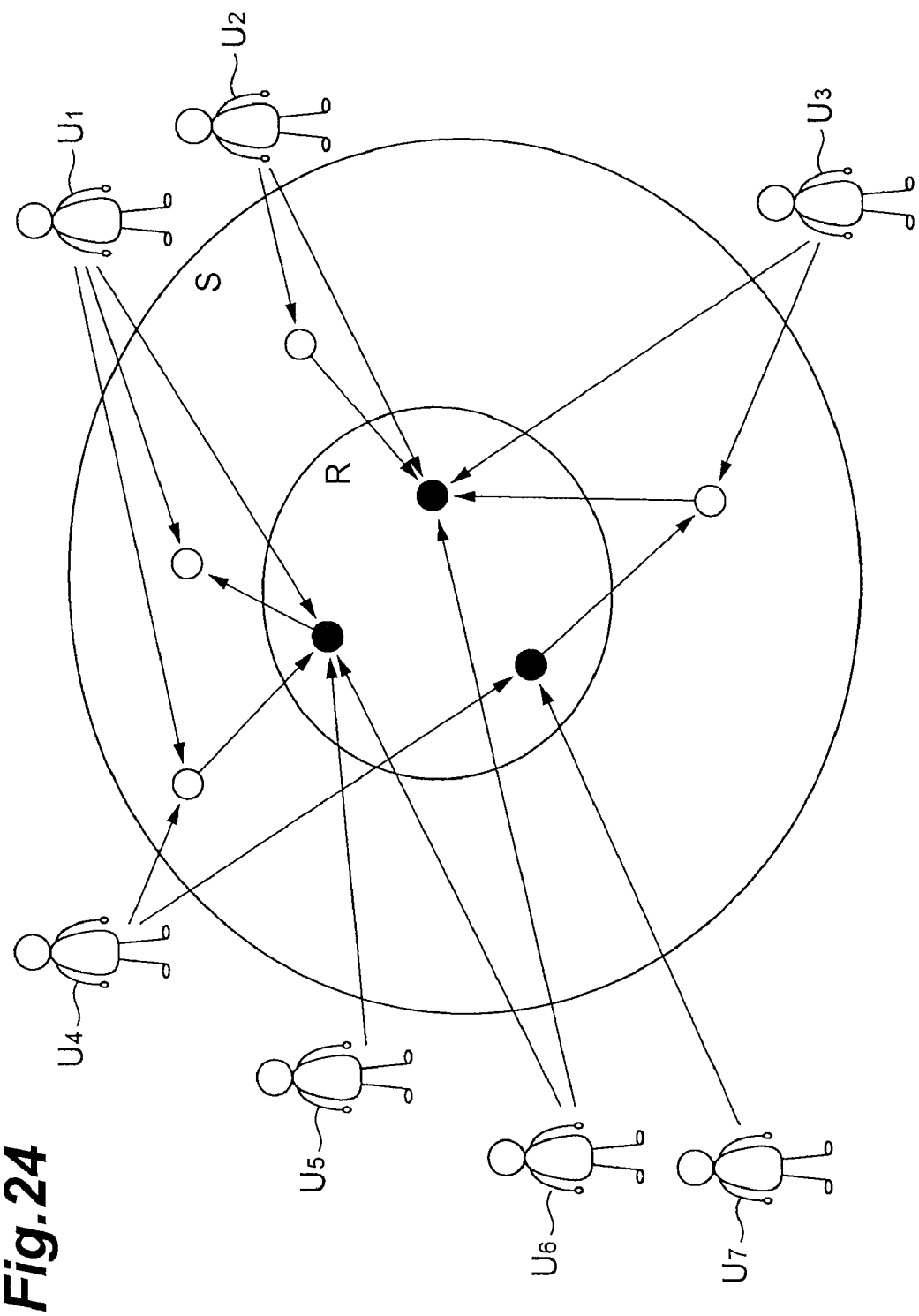
FIG. 24 is a conceptual diagram depicting a concept of an HITS algorithm intervening access status by users.

In other words, a user set U who visited a WWW document set R conforming to the searching word is determined as shown in FIG. 24. Then a WWW document set which the WWW document set R referred to and a WWW document set which referred to the WWW document set R are defined as a WWW document set S. Then a reference information which the user set U referred to WWW documents belonging to the WWW document set S is created in a list format. In concrete terms, the following Expression (43) represents this information.

[Expression 43]

$$E = \{(p \cdot q) | \text{reference from } p \in U \text{ to } q \in S\} \quad (43)$$

The authority score and hub score are represented by the following Expression (44), where M denotes the number of users [of the user set] U, and N denotes a number of documents of the WWW document set S.

[Expression 44]

$$a = (a_0, a_1, \ldots a_p, \ldots a_{N-1})^T$$

$$h = (h_0, h_1, \ldots h_p, \ldots h_{M-1})^T \quad (44)$$

As these vector representations show, the authority score is defined on the set V, and the hub score is defined on the set U.

The calculation is performed according to the following steps. Since this is the same as the above mentioned HITS calculation method, details thereof are omitted.

Step 1: Initialization (See Expression (45))
[Expression 45]

$$a_{<t=0>} = (1, 1, \ldots, 1)^T \epsilon R^N,$$

$$h_{<t=0>} = (1, 1, \ldots, 1)^T \epsilon R^M \quad (45)$$

Step 2: Update

The following Expression (46) is calculated with reference to the reference information E.

[Expression 46]

$$\text{For all } p \epsilon U, h_p = \Sigma_{q:\text{link of } p \to q} a_q$$

$$\text{For all } p \epsilon S, a_p = \Sigma_{q:\text{link of } q \to p} h_q \quad (46)$$

Step 3: Normalization (See Expression (47))
[Expression 47]

$$a_{<t>} \leftarrow a_{<t>} / \|a_{<t>}\|$$

$$h_{<t>} \leftarrow h_{<t>} / \|h_{<t>}\| \quad (47)$$

Every time step 2 and step 3 are repeated, t is incremented by 1, and processing ends when t=100.

In order to execute the above processing according to the present variant form, in the document processing device 700 of the fourth embodiment, the secondary searching unit 705 extracts the WWW document set S, including other WWW documents which refer to each WWW document of the WWW document set R and other WWW document which each WWW document of the WWW document set R refers to, using the index file stored in the index holding unit 701. The secondary searching unit 705 extracts each WWW document of the WWW document set S which each user of the user set U refers to, and extracts the reference information E, then stores this information to the secondary index set holding unit 706.

The authority score calculation unit 707 calculates the authority score a using the reference information E, by the HITS method.

The functional effect of the document processing device 700 according to the present variant form will now be described. In the document processing device 700 of the present variant form, the primary searching unit 702 searches the WWW document set R according to the searching word which was input via the WWW document browser 800, and the secondary searching unit 705 extracts a user set U of users who accessed the searched WWW document set R according to the history information stored in the access history holding unit 704. The secondary searching unit 705 also extracts other WWW documents which each extracted WWW document refers to and other WWW documents which refer to each WWW document, as the WWW document set S, based on the data (index file) which can manage the reference relationships among WWW documents stored in the index storing unit 701 as a directed graph. The second index set holding unit 706 stores reference information E which indicates that each user of the user set U referred to the document set S. The authority score calculation unit 707 can calculate the significance (authority score a) of each WWW document based on a degree of accesses by each user of the user set U to the WWW document set S (hub score h). By this, significance of a WWW document can be calculated accurately, and an accurate search can be implemented.

Fifth Embodiment

Figure 25:
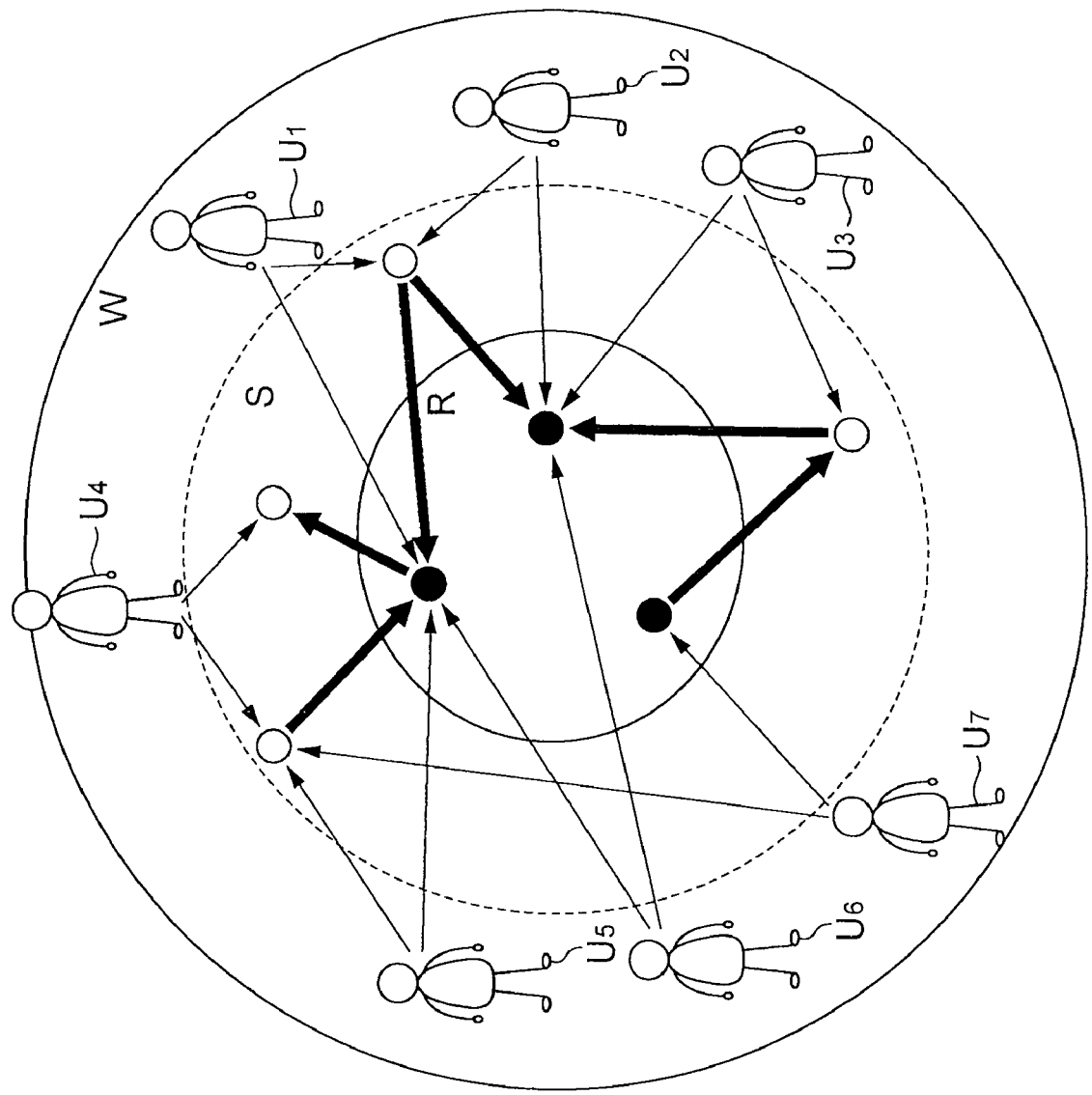
FIG. 25 is a conceptual diagram depicting a concept of an HITS algorithm intervening access status by users.

A fifth embodiment will now be described. According to the fifth embodiment, unlike the fourth embodiment, the WWW documents and users are not distinguished in the link structure, and are handled as the same nodes. The link structure is not 0, 1, but is handled as a continuous value [0.0, 1.0], for example. The data definition in the present embodiment will be described with reference to FIG. 25.

A user set U who accessed a WWW document set R conforming to a searching word is determined. On the other hand, a WWW document set S, which the WWW document set R referred to and which referred to the WWW document set R, is determined. Then a node set W is generated by combining the WWW document set S and the user set U. The number of nodes belonging to the node set W is a value of the number of WWW documents N, and the number of users M which are added together, which is denoted by L=N+M for simplification.

A connection matrix is defined as shown by the following Expression (48).

[Expression 48]

$$C = \begin{bmatrix} c_{00} & \cdots & c_{0,L-1} \\ \vdots & \ddots & \\ c_{L-1,0} & \cdots & c_{L-1,L-1} \end{bmatrix} \quad (48)$$

$C_{ij} = s$: reference from $j (j \in S)$ to $i$
$t$: reference from $j (j \in U)$ to $i$
0: no reference Here it is assumed that in general $0 < t \leq s \leq 1.0$. Here t denotes a weighting factor to a reference when the user refers to a WWW document, and s denotes a weighting factor to a reference when a WWW document in the WWW document set S is referred to. The weight [0, 1.0] is introduced assuming that a reference between documents and a reference between users cannot be handled exactly the same way. For example, s=1.0 is set, and t is determined based on experiment. t=0.001, for example, can be used.

The authority score and hub score are represented by the vectors shown in the following Expression (49).

[Expression 49]

$$a = (a_0, a_1, \ldots a_p, \ldots a_{L-1})^T$$

$$h = (h_0, h_1, \ldots h_p, \ldots h_{L-1})^T \quad (49)$$

As these vector representations show, the authority score is defined on the set W, and the hub score is also defined on the set W.

The calculation is performed according to the following steps. This calculation processing is the same as the HITS method, as mentioned above.

Step 1: Initialization (See Expression (50))

[Expression 50]

$$a_{<t=0>} = (1, 1, \ldots, 1)^T \epsilon R^L,$$

$$h_{<t=0>} = (1, 1, \ldots, 1)^T \epsilon R^L \quad (50)$$

Step 2: Update

The following Expression (51) is calculated with reference to the reference information E.

[Expression 51]

$$\text{For all } p \in W \quad h_p = \sum_{q=0}^{L-1} C_{q,p} a_q \quad (51)$$

$$\text{For all } p \in W \quad a_p = \sum_{q=0}^{L-1} C_{p,q} h_q$$

Step 3: Normalization (See Expression (52))

[Expression 52]

$$a_{<t>} \leftarrow a_{<t>}/\|a_{<t>}\|$$

$$h_{<t>} \leftarrow h_{<t>}/\|h_{<t>}\| \quad (52)$$

Step 4: Convergence Judgment

Step 2 and Step 3 are repeated until the result converges. If there is no convergence, t is incremented by 1 each time, and processing ends when t=100.

Figure 26:
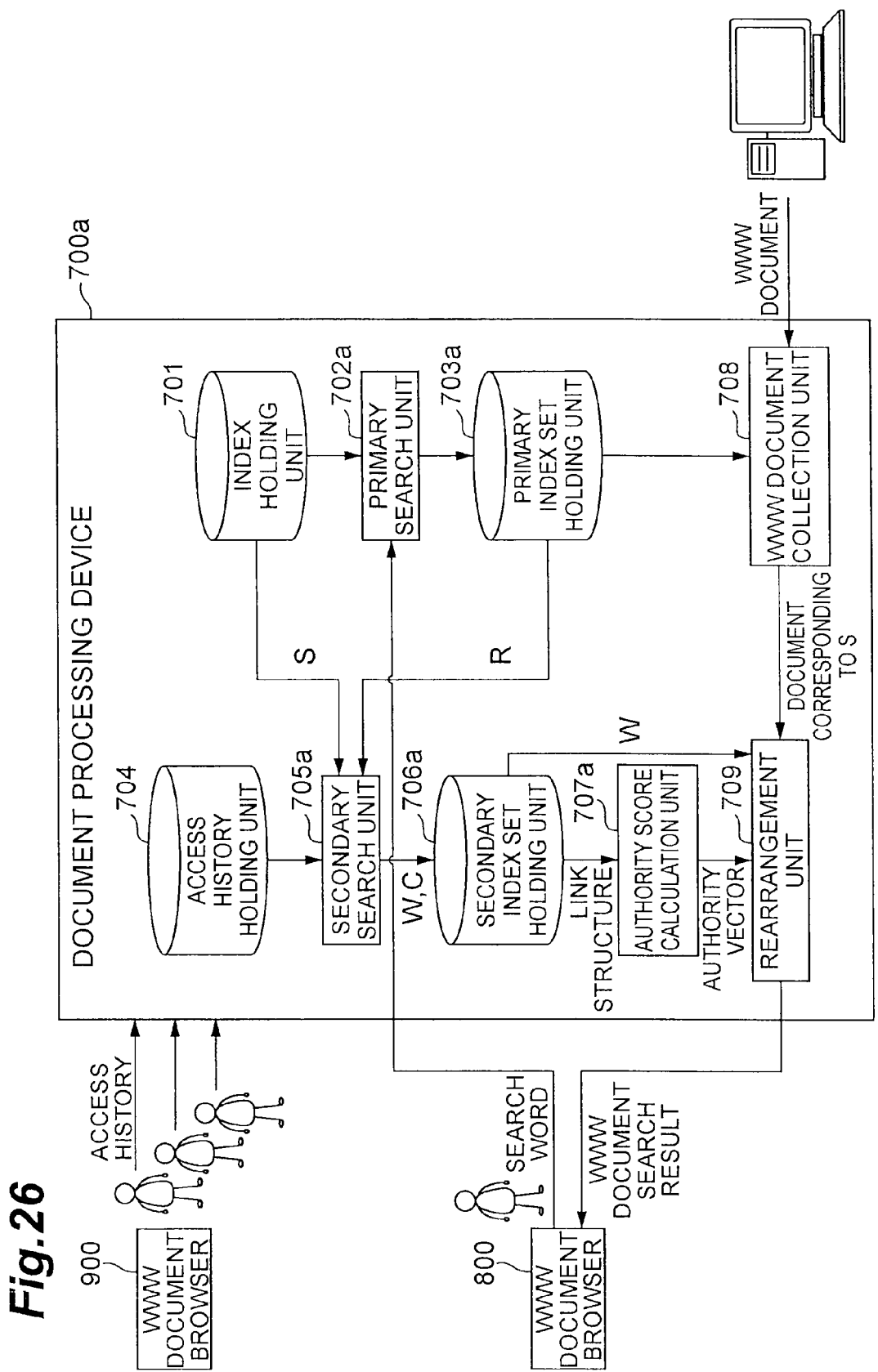
FIG. 26 is a block diagram depicting functions of a document processing device 700a according to a fifth embodiment.

Functions of a document processing device 700a to implement this concrete processing will now be described. FIG. 26 is a block diagram depicting the functions of the document processing device 700a. The difference from the document processing device 700 shown in FIG. 22 is only in the operation content of a primary searching unit 702a (primary WWW document extraction means), primary index set holding unit 703a, secondary searching unit 705a (secondary WWW document extraction means) and secondary index set holding unit 706a.

The primary searching unit 702a generates a WWW document set S based on the searching word. The primary index set holding unit 703a stores the generated WWW document set S. Then the secondary searching unit 705a acquires the WWW document set S, WWW document set V and reference information E, and generates a node set W and connection matrix C. An authority score calculation unit 707a can calculate the authority score by executing the processings in Step 1 to Step 4, as mentioned above.

The functional effect of the document processing device 700a according to the present embodiment will now be described. In the document processing device 700a, the index holding unit 701 stores the data with which reference relationships among the WWW documents can be managed as a directed graph, and the primary searching unit 702a searches according to the searching word which was input from the WWW document browser 800. The secondary searching unit 705a extracts the user set U of users who accessed the WWW document set R including the searched WWW documents. The second searching unit 705a also extracts other WWW documents which each WWW document refers to, and other WWW documents which refer to each WWW document as the WWW document set S based on the data with which the reference relationships can be managed as a directed graph. The secondary searching unit 705a adds the user set U which indicates the extracted users and the WWW document set S of the extracted WWW documents, and generates one node set W. Then weight is assigned to a degree of reference among each WWW document of the generated node set W, and a degree of accesses by each user to each WWW document respectively (connection matrix C), and significance (authority score a) of each WWW document is calculated using this connection matrix C. By this, significance of a WWW document can be calculated accurately, and an accurate search can be implemented.

<Variant Form of Fifth Embodiment>

Figure 27:
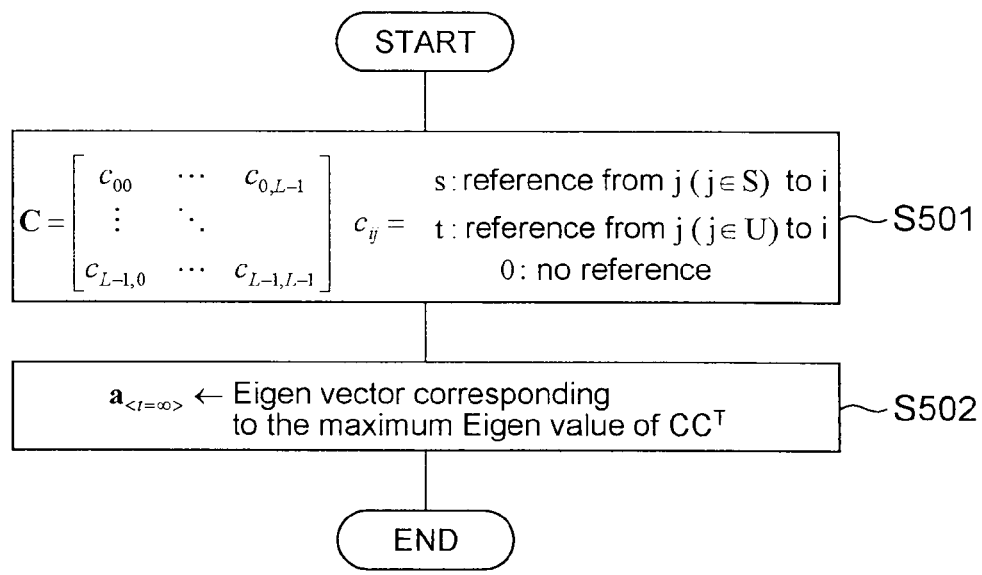

A possible variant form of the fifth embodiment is determining the authority score directly from the connection matrix C, as shown in FIG. 27. As FIG. 27 shows, the authority score calculation unit 707a generates the connection matrix C (S501). Then the transposed matrix $C^T$ of this connection matrix C is generated, and the connection matrix C and transposed matrix $C^T$ are multiplied, so that an Eigen vector corresponding to the maximum Eigen value of $CC^T$ is calculated, thereby the authority score a can be calculated (S502). For this matrix computation, the high-speed approximation algorithm shown in the following reference, for example, could be used.

[Reference]

Taher Haveliwala: "Efficient Computation of Page Rank," Stanford University Technical Report, September 1999, [on-line], [searched on Dec. 8, 2008], Internet: <http://infolab.stanford.edu/%7Etaherh/papers/efficient-pr.pdf>

Sixth Embodiment

A sixth embodiment will now be described. In the fourth and fifth embodiments, the document processing device, assuming use in the search service, was described, but in the sixth embodiment, a device for calculating significance only based on the access pattern of users, for a more general arbitrary searching word, is described.

According to the present embodiment, a hub vector for one WWW document is calculated, and significance of this WWW document to the searching word can be evaluated by fixing this hub vector, and checking what kind of individuals visited this WWW document. Details will be described below.

As FIG. 24 shows, a user set U who visited a WWW document set R conforming to a searching word is determined. Also a WWW document set S, which the WWW document set R referred to and which referred to the WWW document set R, is determined. Then a reference information when the user set U referred to a WWW document belonging to the WWW document set S is created in a list format. Concretely, the following Expression (53) is used.

[Expression 53]

$$E=\{(p\cdot q)| \text{reference from } p\epsilon U \text{ to } q\epsilon S\} \tag{53}$$

Here, the authority and hub score are represented as the vectors of the following Expression (54), where M denotes a number of users in the user set U and N denotes a number of documents in the WWW document set S

[Expression 54]

$$a=(a_0, a_1, \ldots a_p, \ldots a_{N-1})^T$$

$$h=(h_0, h_1, \ldots h_p, \ldots h_{M-1})^T \tag{54}$$

As these vector representations show, the authority score is defined on the WWW document set V, and the hub score is defined on the user set U. The calculation is performed according to the following steps.

step 1: Initialization (See Expression (55))

[Expression 55]

$$a_{<t=0>}=(1, 1, \ldots, 1)^T \epsilon R^N,$$

$$h_{<t=0>}=(1, 1, \ldots, 1)^T \epsilon R^M \tag{55}$$

step 2: Update

The following Expression (56) is calculated with reference to the reference information E.

[Expression 56]

$$\text{For all } p\epsilon U, h_p=\Sigma_{q:\text{link of } p \to q} a_q$$

$$\text{For all } p\epsilon S, a_p=\Sigma_{q:\text{link of } q \to p} h_q \tag{56}$$

step 3: Normalization (See Expression (57))

[Expression 57]

$$a_{<t>} \leftarrow a_{<t>}/\|a_{<t>}\|$$

$$h_{<t>} \leftarrow h_{<t>}/\|h_{<t>}\| \tag{57}$$

Every time Step 2 and Step 3 are repeated, t is incremented by 1, and processing ends when t=100.

FIG. 28 is a block diagram depicting the functions of the document processing device 700b according to the fifth embodiment. The document processing device 700b includes an index holding unit 701, primary searching unit 702 (primary WWW document extraction means), primary index set holding unit 703, access history holding unit 704, secondary searching unit 705 (user extraction means, secondary WWW document extraction means), secondary index set holding unit 706, hub score calculation unit 707b (hub score calculation means), and significance calculation unit 709a (significance calculation means). Since this configuration is generally the same as the above mentioned document processing devices 700 and 700a, only the differences will be described.

The hub score calculation unit 707b of the fifth embodiment is roughly the same as the third and fourth authority score calculation unit 707, but a difference is that a hub vector is output. Using the hub vector calculated by the hub score calculation unit 707b, the significance calculation unit 709a performs the following calculation for the WWW document which was arbitrarily searched and acquired by the primary searching unit 702.

It is assumed that the number of visits of a user who visited this WWW document is recorded in this arbitrarily searched WWW document. In the present embodiment, this visit count is called "visit vector u", and is represented by a column vector of the following Expression (58). M denotes a number of users of the user set U.

[Expression 58]

$$u=(u_0, u_1, \ldots u_{M-1})^T \tag{58}$$

The hub vector calculated by the hub score calculation unit 707b represents a specific searching word, that is, generally a user to be for a hub on a certain topic. Therefore the significance is calculated by the following Expression (59) in the same way as Expression (7).

[Expression 59]

$$\text{Significance}=\text{sim}(u,h) \tag{59}$$

If the cosine distance 1−sim (u, h) between the hub vector and visit vector is small, it can be judged that the WWW document is a WWW document which is the appropriate result for a predetermined searching word, that is, close to the searching word, and significance is high.

As a variant form, other similarities may be used, instead of the cosine distance between the visit vector u and hub vector h. For example, a similarity can be calculated by using the inner product of the visit vector u and hub vector h. To express a non-similarity by distance, an absolute distance, Euclidean distance, Mahalanobis' (generalized) distance, and Minkowsky distance, for example, can be used, instead of the cosine distance.

The functional effect of the document processing device 700b according to the present embodiment will now be described. In the document processing device 700b, the primary searching unit 702a searches according to the searching word which was input via the WWW document browser 800, and extracts a WWW document set R. The secondary searching unit 705a extracts a user set U of users who accessed the searched WWW document set R, and extracts other WWW documents which each extracted WWW document refers to, and other WWW documents which refer to each WWW document, as the WWW document set S, based on the data (index file) with which the reference relationships among WWW documents stored in the index holding unit 701 can be managed as a directed graph. The hub score calculation unit 707b calculates a hub score h, which indicates a degree of accesses to each extracted WWW document S by each user of the extracted user set U, and the significance calculation unit 109 calculates the significance based on a degree of matching of the visit vector u of a user who visited this WWW document included in an arbitrary WWW document and hub score h. By this, significance of a WWW document can be accurately calculated, and an accurate search can be implemented.

The method shown above is when a WWW document acquired by a searching word is a document related to a certain topic, a hub of a user is determined based on the user visit behavior to this document, and fixing this hub a significance on an arbitrary topic of the arbitrary WWW document is shown. This is a method which allows classifying WWW documents by category, using the user visit behavior as observation data, and the WWW documents which are the initial primary searching result as master data.

What is claimed is:

1. A document processing method, comprising:
a collection step of collecting access history of a user;
a document similarity computing step of computing a document similarity, which indicates similarity between documents, by one user pattern which indicates a plurality of users who have accessed one document and another user pattern which indicates a plurality of users who have accessed another document, according to the access history collected in the collection step;
a keyword weight vector correction step of correcting a keyword weight vector of the one document using the document similarity computed in the document similarity computing step, said keyword weight vector correction step including correcting a keyword weight vector in the other document using the document similarity and correcting a keyword weight vector in the one document using the corrected keyword weight vector;
an evaluation value calculation step of calculating an evaluation value for input information for searching, based on the keyword weight vector corrected in the keyword weight vector correction step;
a user similarity computing step of computing user similarity, which indicates similarity between users, by one document pattern which indicates a plurality of documents accessed by one user and another document pattern which indicates a plurality of documents accessed by another user, according to the access history collected in the collection step; and
a user profile correction step of correcting a user profile which indicates characteristics of the one user using the user similarity computed in the user similarity computing step, wherein
the evaluation value calculation step further comprises a step of calculating the evaluation value for the input information for searching based on the user profile of the one user corrected in the user profile correction step.

2. The document processing method according to claim 1, wherein the user profile correction step further comprises a step of correcting a user profile of another user using the user similarity and correcting the user profile of the one user based on the corrected user profile.

3. The document processing method according to claim 1, further comprising an acquisition step of acquiring significance information which indicates a significance attached to each document, wherein
the evaluation value calculation step further comprises a step of calculating an evaluation value for the input information for searching, using the significance information acquired in the acquisition step.

4. The document processing method according to claim 1, wherein
the evaluation value calculation step further comprises a step of calculating an evaluation value using the corrected keyword weight vector when the corrected keyword weight vector in the one document exists, and calculating an evaluation value using the keyword weight vector before correction when the corrected keyword weight vector in the one document does not exist.

5. The document processing method according to claim 1 further comprising an acquisition step of acquiring a document from a search server according to an access by a user, wherein accesses accepted in the acquisition step are collected in the collection step as the access history.

6. The document processing method according to claim 1, further comprising an output step of outputting the search result searched by the user according to the evaluation value calculated in the evaluation value calculation step.

7. A document processing method, comprising:
a collection step of collecting access history of a user;
a document similarity computing step of computing a document similarity, which indicates similarity between documents, by one user pattern which indicates a plurality of users who have accessed one document and another user pattern which indicates a plurality of users who have accessed another document, according to the access history collected in the collection step;
a keyword weight vector correction step of correcting a keyword weight vector of the one document using the document similarity computed in the document similarity computing, said keyword weight vector correction step including correcting a keyword weight vector in the other document using the document similarity and correcting a keyword weight vector in the one document using the corrected keyword weight vector step;
an acquisition step of acquiring significance information which indicates a significance attached to each document;
a significance correction step of distinguishing a first user pattern which indicates users who have accessed one document during a first time period, and a second user pattern which indicates users who have accessed one document during a second time period, according to the accesses history of users collected in the collection step, and correcting the significance of the one document based on the similarity of the first user pattern and the second user pattern and a number of access to the one document;
an evaluation value calculation step of calculating an evaluation value for input information for searching, based on the keyword weight vector corrected in the keyword weight vector correction step, and the significance information corrected in the significance correction step;
a user similarity computing step of computing user similarity, which indicates similarity between users, by one document pattern which indicates a plurality of documents accessed by one user and another document pattern which indicates a plurality of documents accessed by another user, according to the access history collected in the collection step; and
a user profile correction step of correcting a user profile which indicates characteristics of the one user using the user similarity computed in the user similarity computing step, wherein
the evaluation value calculation step further comprises a step of calculating the evaluation value for the input information for searching based on the user profile of the one user corrected in the user profile correction step.

8. A document processing method, comprising:
a first generation step of generating a user profile based on a keyword weight vector that is to be a reference value;
a second generation step of generating a new keyword weight vector based on the user profile generated in the first generation step and the keyword weight vector that is to be a reference value;

a third generation step of generating the new use profile based on the new keyword weight vector generated in the second generation step;

a user profile similarity generation step of computing similarity between the new user profile generated in the third generation step and the user profile generated immediately before the new user profile;

an evaluation value calculation step of calculating an evaluation value based on the similarity computed in the user profile similarity generation step, the keyword weight vector and user profile;

a user similarity computing step of computing user similarity, which indicates similarity between users, by one document pattern which indicates a plurality of documents accessed by one user and another document pattern which indicates a plurality of documents accessed by another user, according to the access history collected in the collection step; and a user profile correction step of correcting a user profile which indicates characteristics of the one user using the user similarity computed in the user similarity computing step, wherein the evaluation value calculation step further comprises a step of calculating the evaluation value for the input information for searching based on the user profile of the one user corrected in the user profile correction step.

9. The document processing method according to claim 8, further comprising a judgment step of judging whether the similarity generated in the user profile similarity generation step is a predetermined value or more, wherein the evaluation value calculation step further comprises a step of calculating the evaluation value based on the keyword weight vector and user profile when the similarity computed in the user profile similarity generation step becomes a predetermined value or more.

10. A document processing device, comprising:

access history collection means for collecting access history of a user;

document similarity computing means for computing a document similarity, which indicates similarity between documents, by a user pattern which indicates a plurality of users who have accessed one document and a user pattern which indicates a plurality of users who have accessed another document, according to the access history collected by the collection means;

keyword weight vector correction means for correcting a keyword weight vector of the one document, using the document similarity computed by the document similarity computing means, which includes correcting a keyword weight vector in the other document using the document similarity and correcting a keyword weight vector in the one document using the corrected keyword weight vector;

evaluation value calculation means for calculating an evaluation value for input information for searching, based on the keyword weight vector corrected by the keyword weight vector correction means;

user similarity computing means for computing user similarity, which indicates similarity between users, by one document pattern which indicates a plurality of documents accessed by one user and another document pattern which indicates a plurality of documents accessed by another user, according to the access history; and user profile correction means for correcting a user profile which indicates characteristics of the one user using the user similarity computed by the user similarity computing means, wherein the evaluation value calculation means comprises means for calculating the evaluation value for the input information for searching based on the user profile of the one user corrected by the user profile correction means.

11. A search system, comprising:

a user terminal for storing access history;

an information collection device for generating a keyword weight vector of a document accessed by the user terminal; and the document processing device according to claim 10, for acquiring the access history of the user terminal and the keyword weight vector generated by the information collection device.

12. The documents processing apparatus according to claim 10, wherein the documents are WWW documents formatted for a mobile terminal.

13. A non-transitory computer readable storage medium encoded with a document processing program, comprising:

a collection module for collecting access history of a user;

a document similarity computing module for computing a document similarity which indicates similarity between documents, by a user pattern which indicates a plurality of users have who accessed one document and a user pattern which indicates a plurality of users who have accessed another document, according to the access history collected by the collection module;

a keyword weight vector correction module for correcting a keyword weight vector of the one document, using the document similarity computed by the document similarity computing module, said correcting includes correcting a keyword weight vector in the other document using the document similarity and correcting a keyword weight vector in the one document using the corrected keyword weight vector;

an evaluation value calculation module for calculating an evaluation value for input information for searching, based on the keyword weight vector corrected by the keyword weight vector correction module;

user similarity computing module for computing user similarity, which indicates similarity between users, by one document pattern which indicates a plurality of documents accessed by one user and another document pattern which indicates a plurality of documents accessed by another user, according to the access history; and user profile correction module for correcting a user profile which indicates characteristics of the one user using the user similarity computed by the user similarity computing module, wherein the evaluation value calculation module comprises a module for calculating the evaluation value for the input information for searching based on the user profile of the one user corrected by the user profile correction module.

14. The documents processing apparatus according to claim 13, wherein the documents are WWW documents formatted for a mobile terminal.

* * * * *